(12) United States Patent
Iino

(10) Patent No.: US 12,464,223 B2
(45) Date of Patent: Nov. 4, 2025

(54) ELECTRONIC DEVICE, CONTROL METHOD OF ELECTRONIC DEVICE, AND NON-TRANSITORY COMPUTER READABLE MEDIUM

(71) Applicant: CANON KABUSHIKI KAISHA, Tokyo (JP)

(72) Inventor: Shuhei Iino, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/938,829

(22) Filed: Nov. 6, 2024

(65) Prior Publication Data

US 2025/0168493 A1  May 22, 2025

(51) Int. Cl.
H04N 23/63 (2023.01)
G03B 35/10 (2021.01)
H04N 13/167 (2018.01)
H04N 13/218 (2018.01)
H04N 23/698 (2023.01)

(52) U.S. Cl.
CPC ......... H04N 23/632 (2023.01); H04N 13/167 (2018.05); H04N 13/218 (2018.05); H04N 23/633 (2023.01); H04N 23/698 (2023.01); G03B 35/10 (2013.01)

(58) Field of Classification Search
CPC .. H04N 13/167; H04N 13/218; H04N 23/631; H04N 23/632; H04N 23/633; H04N 23/635; H04N 23/698; G03B 35/10
See application file for complete search history.

(56) References Cited

U.S. PATENT DOCUMENTS

2010/0134433 A1* 6/2010 Miyanishi ............. G03B 19/00
                                                     345/173
2017/0359536 A1* 12/2017 Lee ..................... H04N 25/617
2019/0215440 A1* 7/2019 Rivard ................... G06V 10/22
2019/0327394 A1* 10/2019 Ramirez Luna ....... A61B 34/77
2022/0345642 A1* 10/2022 Nakagawa ........... H04N 13/218
2022/0385828 A1* 12/2022 Okuwaki ............. H04N 13/296
(Continued)

FOREIGN PATENT DOCUMENTS

JP    2005244562 A    9/2005
JP    2018169517 A    11/2018
JP    2022183845 A    12/2022

*Primary Examiner* — Mainul Hasan
(74) *Attorney, Agent, or Firm* — Cowan, Liebowitz & Latman, P.C.

(57) ABSTRACT

An electronic device acquires an image including a plurality of image areas captured via a plurality of optical systems, performs control so that a display image based on the acquired image is displayed, receives a user operation for specifying coordinates inside the display image, and performs control so that, when the coordinates inside the display image specified by the user operation correspond to coordinates inside a first image area among the plurality of image areas, predetermined processing is executed on a basis of the coordinates inside the first image area, and performs control so that, when the coordinates inside the display image specified by the user operation correspond to coordinates inside a second image area among the plurality of image areas, the predetermined processing is executed on a basis of coordinates inside the first image area corresponding to the coordinates inside the second image area.

9 Claims, 10 Drawing Sheets

(56) References Cited

U.S. PATENT DOCUMENTS

| | | | | |
|---|---|---|---|---|
| 2022/0385829 A1* | 12/2022 | Kinoshita | ............ | H04N 23/632 |
| 2022/0385830 A1* | 12/2022 | Shoda | .................. | H04N 23/663 |
| 2022/0385877 A1* | 12/2022 | Kimata | ................ | H04N 23/635 |
| 2022/0400208 A1* | 12/2022 | Takao | .................. | H04N 23/635 |
| 2023/0281768 A1* | 9/2023 | Mizuno | ................ | H04N 13/302 |
| | | | | 382/168 |
| 2023/0300453 A1* | 9/2023 | Seki | ..................... | H04N 23/611 |
| | | | | 348/49 |

* cited by examiner

ELECTRONIC DEVICE, CONTROL METHOD OF ELECTRONIC DEVICE, AND NON-TRANSITORY COMPUTER READABLE MEDIUM

BACKGROUND

Field of the Disclosure

The present disclosure relates to an electronic device, a control method of the electronic device, and a non-transitory computer readable medium.

Description of the Related Art

There is known a technique for acquiring an image having two image areas with a parallax using two optical systems facing the same direction and displaying the two image areas so as to allow stereoscopic vision thereof. When a circular fish-eye lens is used as each optical system, an image area vertically and horizontally indicating a wide range of 180 degrees (hemispherical, 90 degrees in all directions from image center) or more can be obtained as each image area.

In addition, a function (PC live view) of connecting a camera (digital camera) to a PC (personal computer) and displaying an image captured by the camera on a display device of the PC in real time is proposed (JP 2022-183845 A). In the PC live view, when the user designates an arbitrary point on the displayed image (live view image), a specific instruction (AF instruction, photometric instruction, or the like) related to the position is transmitted to the camera. When receiving a specific instruction, the camera performs a specific operation (AF, photometry, or the like) based on a position designated by the user.

SUMMARY

When an image including the two image areas described above is obtained, it is assumed that specification of a position for a specific operation (AF, photometry, or the like) can be received from a user only in one of the two image areas. However, with such a configuration, the user needs to specify the position while being conscious of an image area in which the specification of the position can be received, and thus the usability is reduced.

The present disclosure provides a technology that enables a user to intuitively specify a position without being conscious of an image area capable of receiving specification of the position (coordinates), and further improves usability.

An electronic device according to the present disclosure includes a processor, and a memory storing a program which, when executed by the processor, causes the electronic device to execute acquisition processing to acquire an image including a plurality of image areas captured via a plurality of optical systems, execute display control processing to perform control so that a display image based on the acquired image is displayed, execute reception processing to receive a user operation for specifying coordinates inside the display image, and execute control processing to perform control so that, in a case where the coordinates inside the display image specified by the user operation correspond to coordinates inside a first image area among the plurality of image areas, predetermined processing is executed on a basis of the coordinates inside the first image area, and perform control so that, in a case where the coordinates inside the display image specified by the user operation correspond to coordinates inside a second image area among the plurality of image areas, the predetermined processing is executed on a basis of coordinates inside the first image area corresponding to the coordinates inside the second image area.

Further features of the present disclosure will become apparent from the following description of exemplary embodiments with reference to the attached drawings.

DESCRIPTION OF THE EMBODIMENTS

In the description below, embodiments of the present disclosure are described with reference to the accompanying drawings.

Figure 1A:
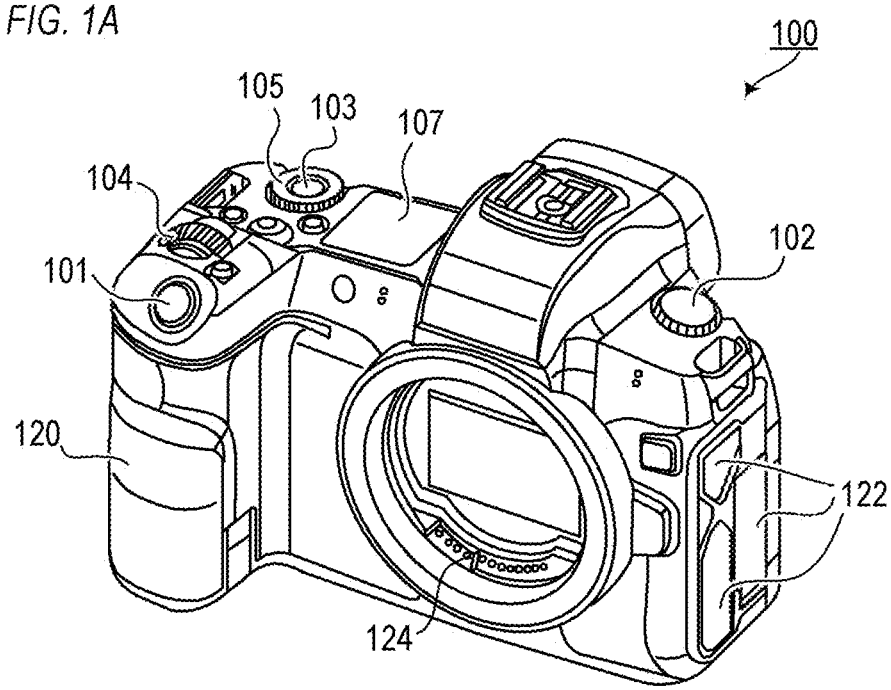
FIGS. 1A and 1B are external views of a camera.
Figure 1B:
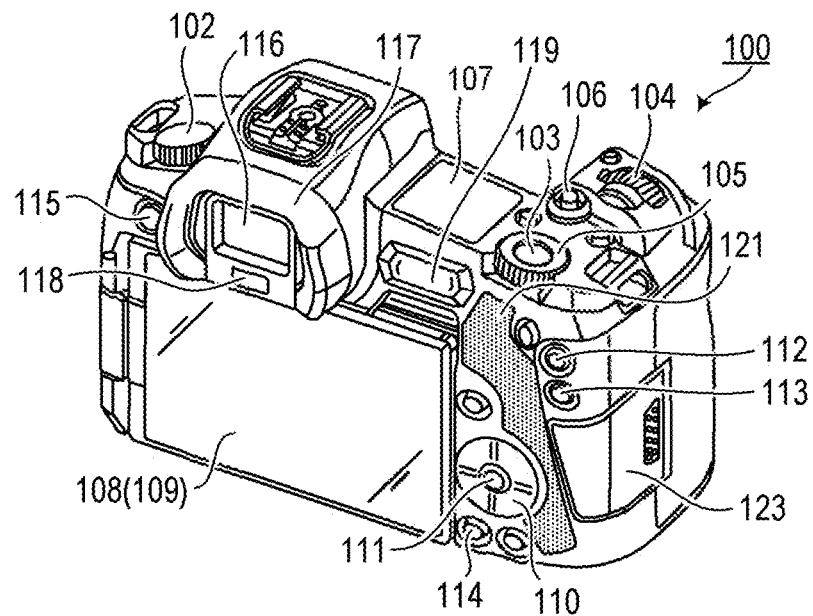

FIGS. 1A and 1B are external views illustrating an example of an external appearance of a digital camera (camera) 100 according to the present embodiment. FIG. 1A is a perspective view of the camera 100 when viewed from the front side, and FIG. 1B is a perspective view of the camera 100 when viewed from the back surface.

The camera 100 includes, on the upper surface thereof, a shutter button 101, a power switch 102, mode selector switch 103, a main electronic dial 104, a sub-electronic dial 105, a movie button 106, and an outside viewfinder display unit 107. The shutter button 101 is an operation member for providing a shooting preparation instruction or a shooting instruction. The power switch 102 is an operation member for switching on or off of the power supply of the camera 100. The mode selector switch 103 is an operation member for switching among various modes. The main electronic dial 104 is a rotary operation member for changing setting values such as a shutter speed and an aperture value. The sub-electronic dial 105 is a rotary operation member for moving a selection frame (cursor) and feeding images. The movie button 106 is an operation member for providing an instruction to start or stop movie shooting (recording). The outside viewfinder display unit 107 displays various setting values such as a shutter speed and an aperture value.

The camera 100 includes, on the back surface, a display unit 108, a touch panel 109, a direction key 110, a SET button 111, an AE lock button 112, an enlargement button 113, a playback button 114, a menu button 115, an eyepiece portion 116, an eyepiece detection unit 118, and a touch bar 119. The display unit 108 displays images and various types of information. The touch panel 109 is an operation member for detecting a touch operation on a display surface (touch operation surface) of the display unit 108. The direction key 110 is an operation member configured with a key (four-direction key) that can be pressed in up, down, left, and right directions. Processing corresponding to the pressed position of the direction key 110 can be performed. The SET button 111 is an operation member to be pressed mainly when a selected item is determined. The AE lock button 112 is an operation member to be pressed when an exposure state is fixed in a shooting standby state. The enlargement button 113 is an operation member for switching on or off an enlargement mode in live view display (LV display) of a shooting mode. In the case where the enlargement mode is switched on, a live view image (LV image) is enlarged or reduced by operating the main electronic dial 104. In addition, the enlargement button 113 is used for enlarging a playback image or increasing an enlargement ratio in a playback mode. The playback button 114 is an operation member for switching between the shooting mode and the playback mode. In case of the shooting mode, according to the press of the playback button 114, the mode shifts to the playback mode, so that it is possible to display the latest one of images recorded in a recording medium 227 described below on the display unit 108.

The menu button 115 is an operation member to be pressed for displaying a menu screen, which enables various settings, on the display unit 108. A user can perform various settings instinctively by using the menu screen displayed in the display unit 108, the direction key 110, and the SET button 111. The eyepiece portion 116 is a portion in which the user approaches and looks through an eyepiece viewfinder (looking-through type viewfinder) 117 with the eyes. The user can visually recognize an image displayed in an EVF 217 (Electronic View Finder) described below which is positioned inside the camera 100 via the eyepiece portion 116. The eyepiece detection unit 118 is a sensor which detects whether the user approaches the eyepiece portion 116 (the eyepiece viewfinder 117) with the eyes.

The touch bar 119 is a linear touch operation member (line touch sensor) that can receive a touch operation. The touch bar 119 is disposed at a position that enables a touch operation (touchable) with the thumb finger of the right hand in a state in which a grip portion 120 is gripped with the right hand (a state in which the grip portion 120 is gripped with the little finger, the ring finger, and the middle finger of the right hand) such that the shutter button 101 can be pressed by the index finger of the right hand. That is, the touch bar 119 can be operated in a state in which the user approaches to the eyepiece viewfinder 117 with the eyes, looks through the eyepiece portion 116, and holds up the camera 100 so as to be able to press the shutter button 101 at any time (shooting orientation). The touch bar 119 can receive a tapping operation on the touch bar 119 (an operation of touching the touch bar and releasing the touch bar without moving the touch position within a predetermined period of time), a sliding operation to the left or right (an operation of touching the touch bar and then moving the touch position while keeping the touch), and the like. The touch bar 119 is an operation member that is different from the touch panel 109 and does not have a display function. The touch bar 119 functions as, for example, a multi-function bar (M-Fn bar) to which various functions can be allocated.

In addition, the camera 100 also includes the grip portion 120, a thumb rest portion 121, a terminal cover 122, a lid 123, a communication terminal 124, and the like. The grip portion 120 is a holding portion which is formed into a shape in which the user can be easily gripped by the right hand when holding up the camera 100. The shutter button 101 and the main electronic dial 104 are arranged at positions where the user can operate the shutter button 101 and the main electronic dial 104 with the index finger of the right hand in a state in which the user holds the camera 100 while gripping the grip portion 120 with the little finger, the ring finger, and the middle finger of the right hand. Also, in the same state, the sub-electronic dial 105 and the touch bar 119 are arranged at positions where the user can operate the sub-electronic dial 105 and the touch bar 119 with the thumb finger of the right hand. The thumb rest portion 121 (thumb standby position) is a grip portion provided at a place where it is easy for the user to place the thumb finger of the right hand that grips the grip portion 120 on the back side of the camera 100 in a state in which any of the operation members is not operated. The thumb rest portion 121 is configured with a rubber member for enhancing the holding power (gripping feeling). The terminal cover 122 protects connectors such as connection cables for connecting the camera 100 to external devices (external equipment). The lid 123 closes a slot for storing the recording medium 227 described below, to protect the recording medium 227 and the slot. The communication terminal 124 is a terminal for communication with a lens unit (a lens unit 200, a lens unit 300, or the like described below) attachable to and detachable from the camera 100.

Figure 2:
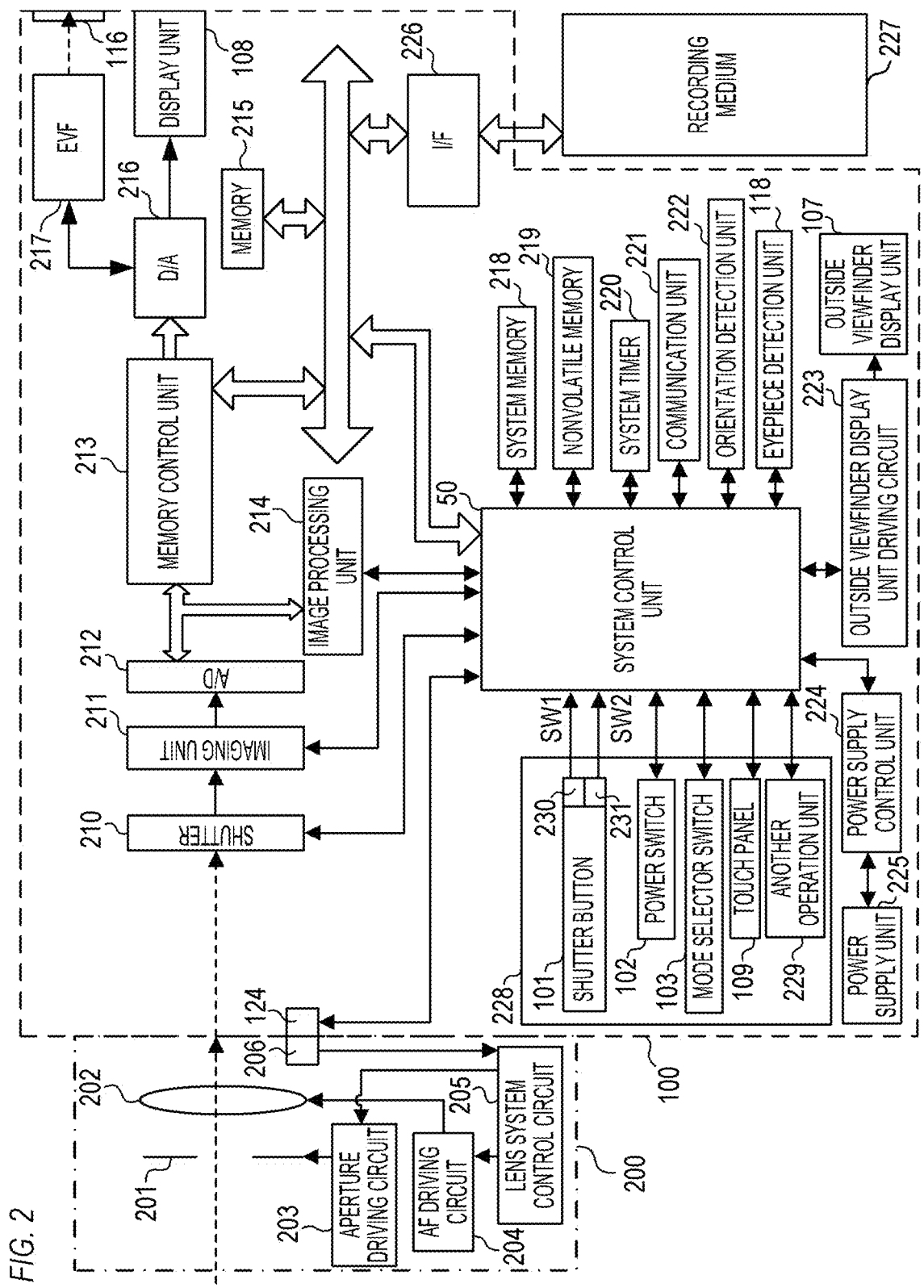
FIG. 2 is a block diagram of the camera.

FIG. 2 is a block diagram illustrating an example of the configuration of the camera 100. In FIG. 2, the same components as those in FIGS. 1A and 1B are denoted by the same reference numerals as in FIGS. 1A and 1, and description of the components is appropriately omitted. In FIG. 2, the lens unit 200 is mounted to the camera 100.

First, the lens unit 200 is described. The lens unit 200 is a type of an interchangeable lens unit (interchangeable lens) that is attachable to and detachable from the camera 100. The lens unit 200 is a single-lens unit (single lens) and is an example of a normal lens unit. The lens unit 200 includes an aperture 201, a lens 202, an aperture driving circuit 203, an auto focus (AF) driving circuit 204, a lens system control circuit 205, and a communication terminal 206, and the like.

The aperture 201 is configured so that an aperture diameter is adjustable. The lens 202 is configured with a plurality of lenses. The aperture driving circuit 203 adjusts a quantity of light by controlling the aperture diameter of the aperture 201. The AF driving circuit 204 adjusts the focus by driving the lens 202. The lens system control circuit 205 controls the aperture driving circuit 203, the AF driving circuit 204, and the like based on instructions from a system control unit 50 described below. The lens system control circuit 205 controls the aperture 201 via the aperture driving circuit 203 and adjusts the focus by changing the position of the lens 202 via the AF driving circuit 204. The lens system control circuit 205 can communicate with the camera 100.

Specifically, the communication is performed via the communication terminal 206 of the lens unit 200 and the communication terminal 124 of the camera 100. The communication terminal 206 is a terminal that enables the lens unit 200 to communicate with the camera 100 side.

Next, the camera 100 is described. The camera 100 includes a shutter 210, an imaging unit 211, an A/D converter 212, a memory control unit 213, an image processing unit 214, a memory 215, a D/A converter 216, the EVF 217, the display unit 108, and the system control unit 50.

The shutter 210 is a focal plane shutter that can freely control the exposure time of the imaging unit 211 based on an instruction of the system control unit 50. The imaging unit 211 is an imaging element (image sensor) configured with a CCD, a CMOS element, or the like that convert an optical image into an electrical signal. The imaging unit 211 may include an imaging-surface phase-difference sensor for outputting defocus-amount information to the system control unit 50. The A/D converter 212 converts an analog signal output from the imaging unit 211 into a digital signal. The image processing unit 214 performs predetermined processing (pixel interpolation, resizing processing such as reduction, color conversion processing, and the like) on data from the A/D converter 212 or data from the memory control unit 213. Moreover, the image processing unit 214 performs predetermined arithmetic processing by using captured image data, and the system control unit 50 performs exposure control and distance measurement control based on an obtained result of calculation. By this processing, through-the-lens (TTL)-type AF processing, auto exposure (AE) processing, EF (flash pre-flash) processing, and the like are performed. Furthermore, the image processing unit 214 performs predetermined arithmetic processing by using the captured image data, and the system control unit 50 performs TTL-type auto white balance (AWB) processing based on the obtained result of calculation.

The image data from the A/D converter 212 is written into the memory 215 via the image processing unit 214 and the memory control unit 213. Alternatively, the image data from the A/D converter 212 is written into the memory 215 via the memory control unit 213 without the intervention of the image processing unit 214. The memory 215 stores the image data that is obtained by the imaging unit 211 and is converted into digital data by the A/D converter 212 and image data to be displayed on the display unit 108 or the EVF 217. The memory 215 includes a storage capacity sufficient to store a predetermined number of still images and a predetermined length of moving images and voice. Also, the memory 215 also serves as a memory for displaying an image (video memory).

The D/A converter 216 converts image data for display stored in the memory 215 into an analog signal and supplies the analog signal to the display unit 108 or the EVF 217. Accordingly, the image data for display written into the memory 215 is displayed on the display unit 108 or the EVF 217 via the D/A converter 216. The display unit 108 and the EVF 217 provide display in response to the analog signal from the D/A converter 216. The display unit 108 and the EVF 217 are, for example, LCD or organic EL displays. The digital signals that are A/D converted by the A/D converter 212 and are accumulated in the memory 215 are converted into the analog signals by the D/A converter 216, and the analog signals are sequentially transferred to and displayed on the display unit 108 or the EVF 217, so that live view display is performed.

The system control unit 50 is a control unit including at least one processor and/or at least one circuit. That is, the system control unit 50 may be a processor, may be a circuit, or may be a combination of a processor and a circuit. The system control unit 50 controls the entire camera 100. The system control unit 50 implements the processing of flowcharts described below, by executing programs recorded in a nonvolatile memory 219. In addition, the system control unit 50 also performs display control by controlling the memory 215, the D/A converter 216, the display unit 108, the EVF 217, and the like.

The camera 100 also includes a system memory 218, the nonvolatile memory 219, a system timer 220, a communication unit 221, an orientation detection unit 222, and the eyepiece detection unit 118.

For example, a RAM is used as the system memory 218. In the system memory 218, constants, variables, and programs read from the nonvolatile memory 219 for the operation of the system control unit 50 are loaded. The nonvolatile memory 219 is an electrically erasable and recordable memory. For example, an EEPROM is used as the nonvolatile memory 219. In the nonvolatile memory 219, constants, programs, and the like for the operation of the system control unit 50 are recorded. The program as used herein includes programs for performing the flowcharts described below. The system timer 220 is a timer unit that counts time used for various types of control and time of a built-in clock. The communication unit 221 transmits and receives a video signal and a voice signal to and from external device connected wirelessly or via a wired cable. The communication unit 221 is also connectable to a wireless local area network (LAN) and the Internet. Moreover, the communication unit 221 can communicate with external device also via Bluetooth (registered trademark) and Bluetooth Low Energy. The communication unit 221 can transmit an image captured by the imaging unit 211 (including a live image) and an image recorded in the recording medium 227 and can receive an image and other various types of information from an external device. The orientation detection unit 222 is an orientation detection sensor that detects the orientation of the camera 100 with respect to the direction of gravity. Based on the orientation detected by the orientation detection unit 222, whether an image shot by the imaging unit 211 is an image shot with the camera 100 held in a horizontal position or held in a vertical position can be determined. The system control unit 50 can add orientation information in accordance with the orientation detected by the orientation detection unit 222 to an image file of the image shot by the imaging unit 211 and can rotate the image according to the detected orientation. For example, an acceleration sensor or a gyro sensor can be used for the orientation detection unit 222. It is possible to also detect the movement of the camera 100 (whether it is panning, tilting, lifting, stationary, or the like) by using the orientation detection unit 222.

The eyepiece detection unit 118 can detect an object approaching the eyepiece portion 116 (eyepiece viewfinder 117). For example, an infrared proximity sensor can be used as the eyepiece detection unit 118. When an object approaches, infrared light emitted from a light-emitting portion of the eyepiece detection unit 118 is reflected on the object and is received by a light-receiving portion of the infrared proximity sensor. A distance from the eyepiece portion 116 to the object can be determined according to the amount of received infrared light. In this way, the eyepiece detection unit 118 performs eye approach detection for detecting a distance between the eyepiece portion 116 and the object approaching the eyepiece portion 116. The eyepiece detection unit 118 is an eyepiece detection sensor that detects approach (eye approach) and separation (eye separation) of an eye (object) to and from the eyepiece portion 116. In a case where an object approaching the eyepiece portion 116 within a predetermined distance is detected in a non-eye approach state (non-approach state), the eyepiece detection unit 118 detects that an eye approaches. Meanwhile, in a case where the object of which the approach is detected is separated by a predetermined distance or longer in an eye approach state (approach state), the eyepiece detection unit 118 detects that an eye is separated. A threshold value for detecting the eye approach and a threshold value for detecting the eye separation may be different for providing, for example, a hysteresis. In addition, after the eye approach is detected, the eye approach state is assumed until the eye separation is detected. After the eye separation is detected, the non-eye approach state is assumed until the eye approach is detected. The system control unit 50 switches between display (display state) and non-display (non-display state) of each of the display unit 108 and the EVF 217 according to the state detected by the eyepiece detection unit 118. Specifically, in a case where at least the shooting standby state is established, and a switching setting for a display destination is set to automatic switching, the display destination is set as the display unit 108, and the display is turned on, while the EVF 217 is set to non-display during the non-eye approach state. In addition, the display destination is set as the EVF 217, and the display is turned on, while the display unit 108 is set to non-display during the eye approach state. Note that the eyepiece detection unit 118 is not limited to the infrared proximity sensor, and other sensors may be used as the eyepiece detection unit 118 as long as the sensors can detect the state which can be regarded as the eye approach.

Also, the camera 100 includes the outside viewfinder display unit 107, an outside viewfinder display unit driving circuit 223, a power supply control unit 224, a power supply unit 225, a recording medium I/F 226, and an operation unit 228.

The outside viewfinder display unit 107 is driven by the outside viewfinder display unit driving circuit 223 and displays various setting values for the camera 100 such as a shutter speed and an aperture value. The power supply control unit 224 is configured with a battery detection circuit, a DC-DC converter, a switch circuit that switches the block to be energized, and the like and detects whether a battery is mounted, the type of battery, the remaining battery level, and the like. Moreover, the power supply control unit 224 controls the DC-DC converter based on the detection result and an instruction from the system control unit 50 and supplies a required voltage to portions including the recording medium 227 for a necessary period of time. The power supply unit 225 is a primary battery such as alkaline and lithium batteries, a secondary battery such as NiCd, NiMH, and Li batteries, an AC adapter, or the like. The recording medium I/F 226 is an interface to the recording medium 227 such as a memory card and a hard disk. The recording medium 227 is a memory card for recording shot images, and the like and is configured with a semiconductor memory, a magnetic disk, and the like. The recording medium 227 may be attachable to and detachable from the camera 100 or may also be embedded in the camera 100.

The operation unit 228 is an input unit (receiving unit) that can receive operations from the user (user operations) and is used for inputting various instructions to the system control unit 50. The operation unit 228 includes the shutter button 101, the power switch 102, the mode selector switch 103, the touch panel 109, another operation unit 229, and the like. The other operation unit 229 includes the main electronic dial 104, the sub-electronic dial 105, the movie button 106, the direction key 110, the SET button 111, the AE lock button 112, the enlargement button 113, the playback button 114, the menu button 115, and the touch bar 119.

The shutter button 101 includes a first shutter switch 230 and a second shutter switch 231. The first shutter switch 230 is turned on in the middle of the operation of the shutter button 101 in response to so-called half-press (shooting preparation instruction) and outputs a first shutter switch signal SW1. The system control unit 50 starts shooting preparation processing such as AF processing, AE processing, AWB processing, and EF processing in response to the first shutter switch signal SW1. The second shutter switch 231 is turned on at the completion of the operation of the shutter button 101 in response to so-called full-press (shooting instruction) and outputs a second shutter switch signal SW2. In response to the second shutter switch signal SW2, the system control unit 50 starts a sequence of shooting processing involving reading of a signal from the imaging unit 211, generating an image file including the shot image, and writing of the generated image file into the recording medium 227.

The mode selector switch 103 switches the operation mode of the system control unit 50 to any one of a still image shooting mode, a movie shooting mode, and a playback mode. Examples of the modes of the still image shooting mode include an auto shooting mode, an auto scene-determination mode, a manual mode, an aperture-priority mode (Av mode), a shutter-speed priority mode (Tv mode), and a program AE mode (P mode). Examples of the mode also include various scene modes which have shooting settings for different shooting scenes, a custom mode, and the like. The user can directly switch the operation mode to any of the above-described shooting modes with the mode selector switch 103. Alternatively, the user can once switch a screen to a list screen of the shooting modes with the mode selector switch 103 and then selectively switch the operation mode to any of a plurality of displayed modes by using the operation unit 228. Likewise, the movie shooting mode may include a plurality of modes.

The touch panel 109 is a touch sensor for detecting various touch operations on the display surface of the display unit 108 (the operation surface of the touch panel 109). The touch panel 109 and the display unit 108 can be integrally configured. For example, the touch panel 109 is attached to an upper layer of the display surface of the display unit 108 so that the transmittance of light does not hinder the display on the display unit 108. Furthermore, input coordinates on the touch panel 109 and display coordinates on the display surface of the display unit 108 are associated with each other, thereby configuring a graphical user interface (GUI) with which the user can operate a screen displayed on the display unit 108 as if the user directly operates the screen. The touch panel 109 can use any of various methods including resistive film, capacitive, surface acoustic wave, infrared, electromagnetic induction, image recognition, optical sensor methods, and the like. Depending on the methods, there are a method of detecting a touch based on contact with the touch panel 109 and a method of detecting a touch based on approach of a finger or a pen to the touch panel 109, but any method may be adopted.

For the touch panel 109, the system control unit 50 can detect the following operations or states:

- An operation in which a finger or a pen that is not in contact with the touch panel 109 newly touches the touch panel 109, that is, a start of a touch (hereinafter referred to as touch-down).
- A state in which the finger or the pen is in contact with the touch panel 109 (hereinafter referred to as touch-on).
- An operation in which the finger or the pen is moving while being in contact with the touch panel 109 (hereinafter referred to as touch-move).
- An operation in which the finger or the pen that is in contact with the touch panel 109 is separated from (released from) the touch panel 109, that is, an end of the touch (hereinafter referred to as touch-up).
- A state in which nothing is in contact with the touch panel 109 (hereinafter referred to as touch-off).

When the touch-down is detected, the touch-on is detected at the same time. After the touch-down, the touch-on is continuously detected normally unless the touch-up is detected. Also, when the touch-move is detected, the touch-on is continuously detected. Even if the touch-on is detected, the touch-move is not detected as long as the touch position is not moved. After the touch-up of all the fingers and the pen that have been in contact with the touch panel 109 is detected, the touch-off is established.

These operations and states and the position coordinates of the finger or the pen that is in contact with the touch panel 109 are notified to the system control unit 50 through an internal bus. The system control unit 50 determines what kind of operation (touch operation) is performed on the touch panel 109, based on the notified information. With regard to the touch-move, a movement direction of the finger or the pen moving on the touch panel 109 can be determined for each vertical component and for each horizontal component on the touch panel 109, based on change of the position coordinates. When the touch-move for a predetermined distance or longer is detected, it is determined that a sliding operation is performed. An operation in which a finger is swiftly moved by a certain distance while being in contact with the touch panel 109 and is separated is referred to as a flick. In other words, the flick is an operation in which the finger is swiftly slid on the touch panel 109 so as to flick the touch panel 109. When the touch-move for a predetermined distance or longer at a predetermined speed or higher is detected, and then the touch-up is detected without change, it is determined that the flick is performed (it can be determined that the flick is performed subsequently to the sliding operation). Furthermore, a touch operation in which a plurality of places (for example, two points) are both touched (multi-touched) and the touch positions are brought close to each other is referred to as pinch-in, and a touch operation in which the touch positions are moved away from each other is referred to as pinch-out. The pinch-out and the pinch-in are collectively referred to as a pinching operation (or simply referred to as a pinch).

Figure 3:
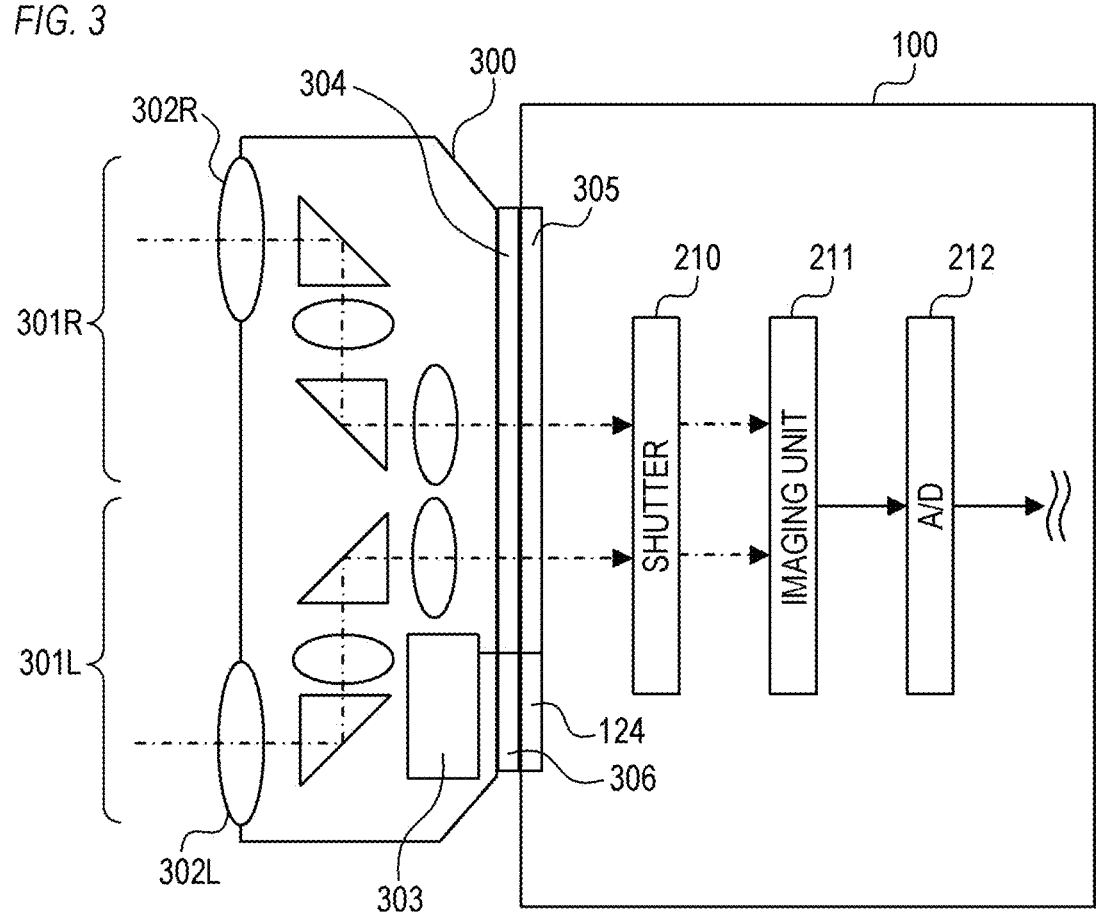
FIG. 3 is a schematic diagram illustrating a configuration of a lens unit.

FIG. 3 is a schematic diagram illustrating an example of the configuration of the lens unit 300. FIG. 3 illustrates a state in which the lens unit 300 is mounted on the camera 100. In the camera 100 shown in FIG. 3, the same components as those in FIG. 2 are denoted by the same reference numerals as in FIG. 2, and description thereof is appropriately omitted. Components related to the right eye are denoted by R at the end of the reference numeral, components related to the left eye are denoted by L at the end of the reference numeral, and components related to both the right eye and the left eye are denoted by neither R nor L at the end.

The lens unit 300 is a type of an interchangeable lens unit attachable to and detachable from the camera 100. The lens unit 300 is a dual-lens unit capable of capturing a right image and a left image having a parallax. The lens unit 300 includes two optical systems, and each of the two optical systems can capture an image in a range at a wide viewing angle of about 180 degrees. Specifically, each of the two optical systems of the lens unit 300 can capture an image of an object corresponding to a field of view (angle of view) of 180 degrees in the left-to-right direction (horizontal angle, azimuth angle, yaw angle) and 180 degrees in the up-and-down direction (vertical angle, elevation angle, pitch angle). That is, each of the two optical systems can capture an image in a front hemispherical range.

The lens unit 300 includes an optical system 301R including a plurality of lenses, reflecting mirrors, and the like, an optical system 301L including a plurality of lenses, reflecting mirrors, and the like, and a lens system control circuit 303. The optical system 301R includes a lens 302R disposed near the object, and the optical system 301L includes a lens 302L disposed near the object. That is to say that the lens 302R and the lens 302L are disposed to the object side of the lens unit 300. The lens 302R and the lens 302L are oriented in the same direction and the optical axes thereof are substantially parallel to each other.

The lens unit 300 is a dual-lens unit (VR180 lens unit) for obtaining a VR180 image that is one of virtual reality (VR) image formats capable of binocular stereoscopic vision. In the lens unit 300, each of the optical system 301R and the optical system 301L includes a fish-eye lens capable of capturing a range of about 180 degrees. Note that the range that can be captured by the lens of each of the optical system 301R and the optical system 301L may be a range of about 120 degrees or 160 degrees narrower than the range of 180 degrees. Put another way, the optical systems 301R and 301L may be in the range of about 120 degrees to about 180 degrees. The lens unit 300 can form a right image formed through the optical system 301R and a left image formed through the optical system 301L on one or two imaging elements of the camera to which the lens unit 300 is attached. In the camera 100, the right image and the left image are formed on one imaging element (imaging sensor), and one image (binocular image) is generated in which a right image area (area of right image) and a left image area (area of left image) are arranged side by side.

The lens unit 300 is mounted to the camera 100 via a lens mount portion 304 of the lens unit 300 and a camera mount portion 305 of the camera 100. In this manner, the system control unit 50 of the camera 100 and the lens system control circuit 303 of the lens unit 300 are thus electrically connected to each other via the communication terminal 124 of the camera 100 and a communication terminal 306 of the lens unit 300.

In FIG. 3, the right image formed through the optical system 301R and the left image formed through the optical system 301L are formed side by side in the imaging unit 211 of the camera 100. In other words, the optical system 301R and the optical system 301L form two optical images (object images) in the two areas of one imaging element (imaging sensor). The imaging unit 211 converts the formed optical image (optical signal) into an analog electrical signal. By using the lens unit 300 in this manner, one image including two image areas having a parallax can be acquired from two places (optical systems) of the optical system 301R and the optical system 301L. By dividing the acquired image into a left-eye image and a right-eye image and performing VR display of the images, the user can view a three-dimensional VR image in a range of about 180 degrees. That is, the user can stereoscopically view the image of VR180.

Here, a VR image is an image that can be viewed in VR display described below. Examples of VR images include an omnidirectional image (whole spherical image) captured by an omnidirectional camera (whole spherical camera) and a panoramic image having a wider video range (effective video range) than a display range that can be displayed at once on a display unit. Examples of VR images also include a moving image and a live image (an image acquired substantially in real time from a camera), as well as a still image. The VR image has a maximum video range (effective video range) corresponding to a field of view of 360 degrees in a left-to-right direction and 360 degrees in an up-and-down direction. Examples of the VR image also include images having an angle of view wider than an angle of view that can be captured by a normal camera or a video range wider than a display range that can be displayed at a time in the display unit, even when the angle of view or video range is smaller than 360 degrees in the left-to-right direction and 360 degrees in the up-and-down direction. An image captured by the camera 100 with the lens unit 300 described above is a type of the VR image. The VR image can be viewed in VR display by setting, for example, a display mode of a display device (a display device capable of displaying a VR image) at "VR view". A certain range of a VR image with an angle of view in 360 degrees is displayed so that the user can view a seamless omnidirectional video in the left-to-right direction by changing the orientation of the display device in the left-to-right direction (horizontal rotation direction) to move the displayed range.

The VR display (VR view) is a display method (display mode) for displaying, from among VR images, a video in a field-of-view range depending on the orientation of the display device, the display method being capable of changing its display range. Examples of the VR display include "single-lens VR display (single-lens VR view)" in which one image is displayed after deformation (distortion correction) for mapping a VR image on a virtual sphere. Examples of the VR display include "dual-lens VR display (dual-lens VR view)" in which a left-eye VR image and a right-eye VR image are displayed in left and right areas side by side after deformation for mapping the VR images on a virtual sphere. The "dual-lens VR display" is performed by using the left-eye VR image and the right-eye VR image having a parallax, thereby achieving a stereoscopic vision of the VR images. In any type of VR display, for example, when the user wears a display device such as a head mounted display (HMD), a video in the field-of-view range corresponding to the orientation of the user's face is displayed. For example, it is assumed that from among the VR images, a video is displayed in a field-of-view range having the center thereof at 0 degrees in the left-to-right direction (a specific orientation, such as the north) and 90 degrees in the up-and-down direction (90 degrees from the zenith, which is the horizon) at a certain point of time. In this state, if the orientation of the display device is reversed (for example, the display surface is changed from a southern direction to a northern direction), from among the same VR images, the display range is changed to a video in a field-of-view range having the center thereof at 180 degrees in the left-to-right direction (the opposite orientation, such as the south) and 90 degrees in the up-and-down direction. That is, when the user wearing the HMD faces the south from the north (or looks back), the video displayed on the HMD is changed from a video of the north to a video of the south. Note that the VR image captured with the lens unit 300 is an image (180-degree image) obtained by capturing the range of about 180 degrees in the front, and any video does not exist in the range of about 180 degrees in the rear. In the VR display of such an image, when the orientation of the display device is changed to a side on which any video image does not exist, a blank area is displayed.

Such VR display of a VR image makes the user visually feel like existing in the VR image (in a VR space) (sense of immersion). Note that the VR image display method is not limited to the method for changing the orientation of the display device. For example, the display range may be moved (scrolled) in response to a user operation via a touch panel, directional buttons, or the like. In addition to the change of the display range by changing the orientation during the VR display (in the "VR view" display mode), the display range may be changed in response to a touch-move on the touch panel, a dragging operation with a mouse device or the like, or pressing the directional buttons. In addition, a smartphone mounted to VR goggles (head-mounted adapter) is a type of the HID.

Figure 4:
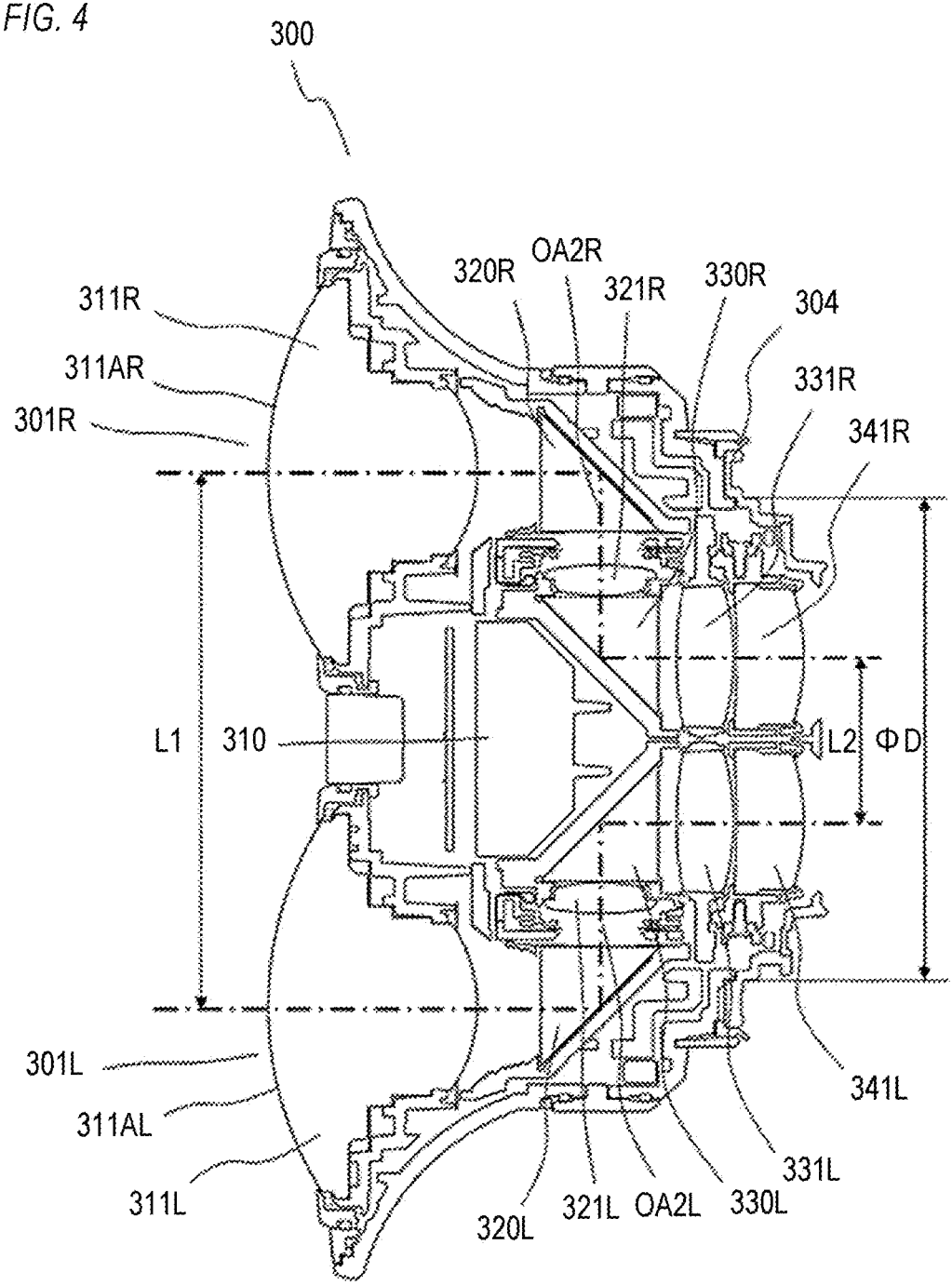
FIG. 4 is a cross-sectional view of the lens unit.
Figure 5A:
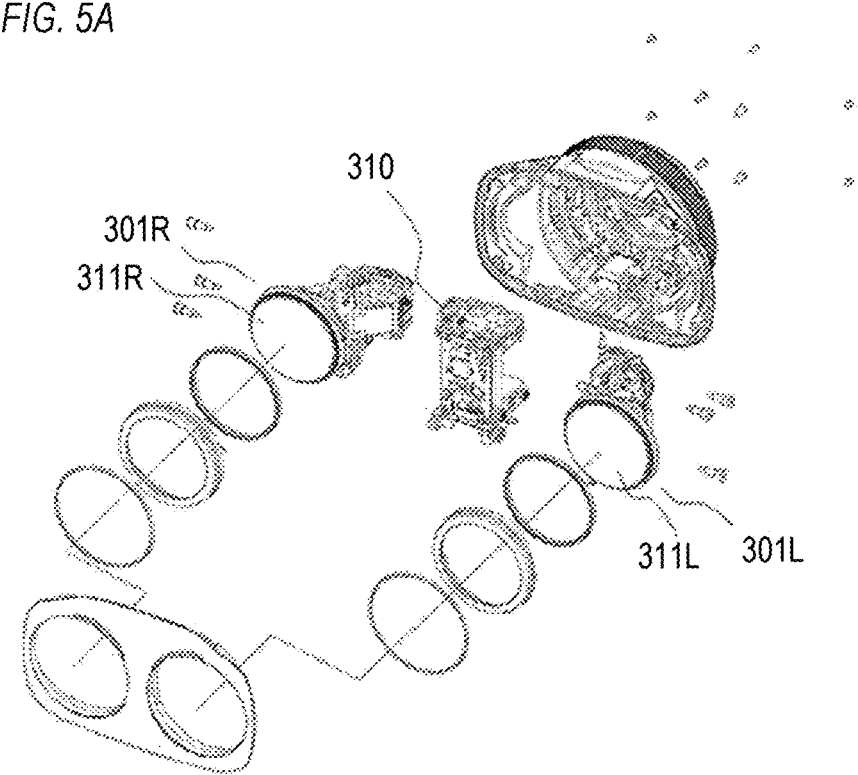
FIGS. 5A and 5B are exploded perspective views of the lens unit.
Figure 5B:
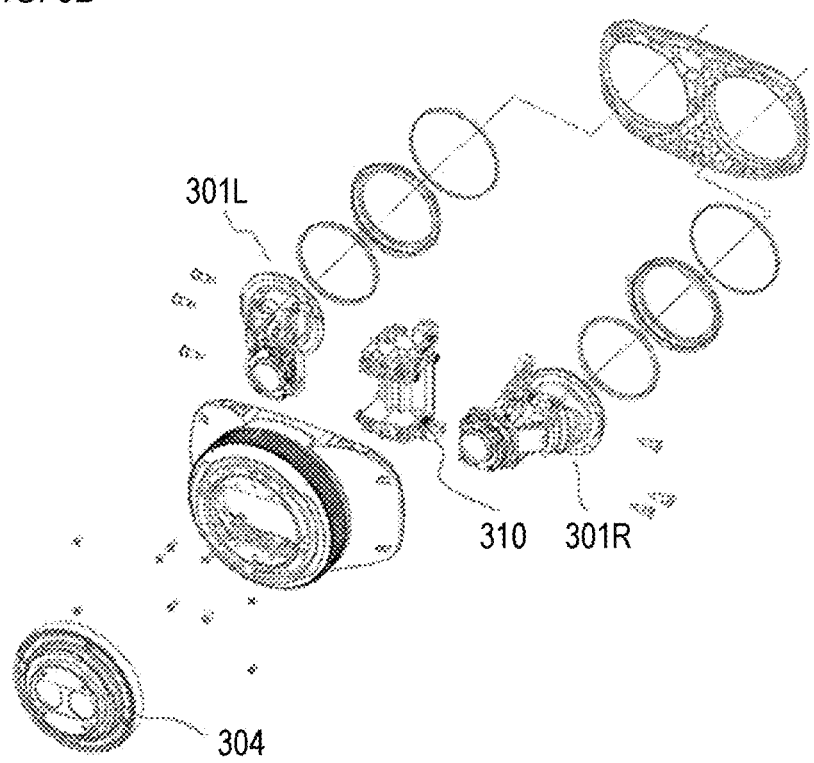

The configuration of the lens unit 300 is described in more detail. FIG. 4 is a cross-sectional view illustrating an example of a configuration of the lens unit 300, and FIGS. 5A and 5B are exploded perspective views illustrating an example of a configuration of the lens unit 300. FIG. 5A is a perspective view of the lens unit 300 as viewed from the front side, and FIG. 5B is a perspective view of the lens unit 300 as viewed from the back side.

Each of the optical system 301R and the optical system 301L is fixed to a lens top base 310 by screw fastening or the like. The optical axes of the optical system 301R include, from the object side, a first optical axis OA1R, a second optical axis OA2R substantially orthogonal to the first optical axis OA1R, and a third optical axis OA3R substantially parallel to the first optical axis OA1R. Similarly, the optical axes of the optical system 301L include a first optical axis OA1L, a second optical axis OA2L, and a third optical axis OA3L.

The optical system 301R includes a first lens 311R, a second lens 321R, a third lens 331R, and a fourth lens 341R. The first lens 311R is disposed on the first optical axis OA1R, and a surface 311AR of the first lens 311R on the object side has a convex shape. The second lens 321R is disposed on the second optical axis OA2R. The third lens 331R and the fourth lens 341R are disposed on the third optical axis OA3R. Similarly, the optical system 301L includes a first lens 311L, a second lens 321L, a third lens 331L, and a fourth lens 341L.

Furthermore, the optical system 301R includes a first prism 320R and a second prism 330R. The first prism 320R bends the light flux entering the first lens 311R from the object side in a direction substantially parallel to the second optical axis OA2R from a direction substantially parallel to the first optical axis OA1R and guides the light flux to the second lens 321R. The second prism 330R bends the light flux entering the second lens 321R from a direction substantially parallel to the second optical axis OA2R to a direction substantially parallel to the third optical axis OA3R and guides the light flux to the third lens 331R (and the fourth lens 341R). Similarly, the optical system 301L includes a first prism 320L and a second prism 330L.

Figure 6:
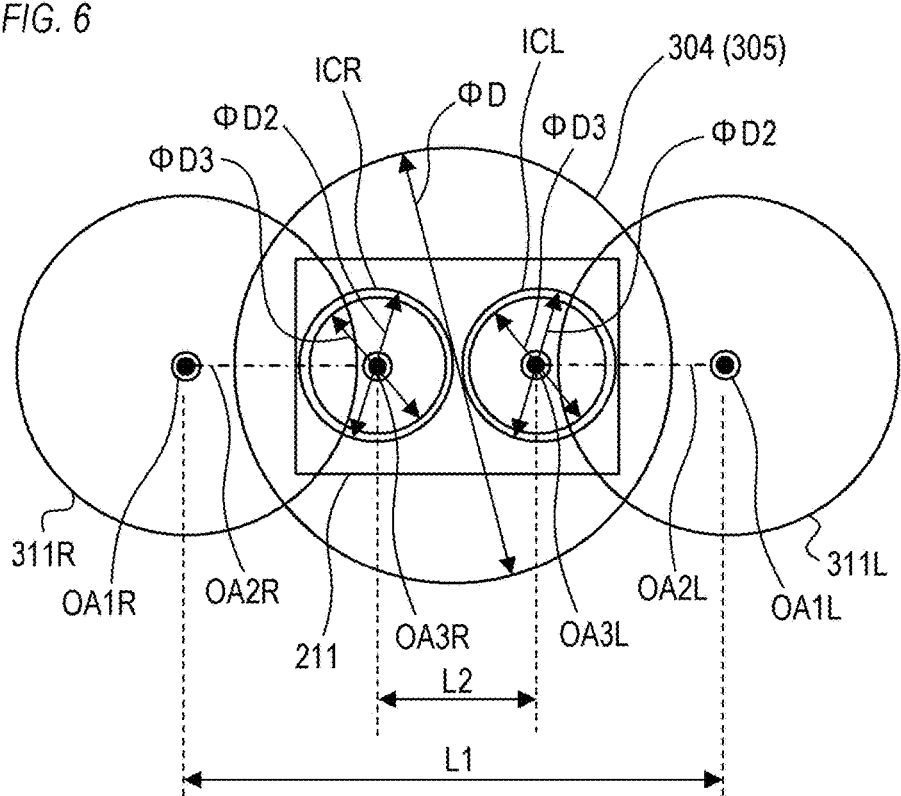
FIG. 6 is a schematic diagram illustrating a positional relationship between each optical axes and an image circle.

FIG. 6 is a schematic diagram illustrating a positional relationship between each optical axes and an image circle on the imaging unit 211. An image circle ICR corresponding to the effective angle of view of the optical system 301R and an image circle ICL corresponding to the effective angle of view of the optical system 301L are formed in parallel on the imaging unit 211 of the camera 100. Diameters $\Phi D2$ of the image circles ICR and ICL and the distance between the image circle ICR and the image circle ICL are preferably set so that the image circle ICR and the image circle ICL do not overlap with each other. For example, the arrangement of the image circles ICR and ICL is set so that the center of the image circle ICR is arranged substantially in the center of the right area, and the center of the image circle ICL is arranged substantially in the center of the left area among two areas obtained by dividing the light receiving range of the imaging unit 211 into two in the left and right directions. The size and arrangement of the image circles ICR and ICL are determined by, for example, the configuration of the lens unit 300 (and the camera 100).

In FIG. 6, a distance L1 is a distance (base line length) between the first optical axis OA1R and the first optical axis OA1L. In the stereoscopic vision of the image obtained by using the lens unit 300, a higher stereoscopic effect can be obtained as the base line length L1 is longer. For example, it is assumed that the sensor size (size of imaging surface (light receiving surface, light receiving range)) of the imaging unit 211 is 24 mm in length×36 mm in width, and the diameters ΦD2 of the image circles ICR and ICL are 17 mm. Also, a distance L2 between the third optical axis OA3R and the third optical axis OA3L is 18 mm, and the lengths of the second optical axes OA2R and OA2L are 21 mm. Assuming that the second optical axes OA2R and OA2L extend in the horizontal direction, the base line length L1 is 60 mm, which is substantially equal to the eye width of an adult (the distance between the right eye and the left eye).

A diameter ΦD of the lens mount portion 304 may be longer or shorter than the base line length L1. When a distance L2 between the third optical axis OA3R and the third optical axis OA3L is shorter than the diameter ΦD of the lens mount portion 304, the third lenses 331R and 331L and the fourth lenses 341R and 341L can be arranged inside the lens mount portion 304. In FIG. 6, a relationship of L1>ΦD>L2 is established.

When the dual-lens VR display having a field of view (angle of view) of about 120 degrees is performed, a sufficient stereoscopic effect can be obtained. However, since a sense of discomfort remains when the visual field is about 120 degrees, the angle of view (effective angle of view) of the optical systems 301R and 301L is about 180 degrees in many cases. In FIG. 6, the angle of view (effective angle of view) of the optical systems 301R and 301L is larger than 180 degrees, and a diameter φD3 of the image circle in the range of 180 degrees is smaller than the diameter φD2 of the image circles ICR and ICL.

Figure 7:
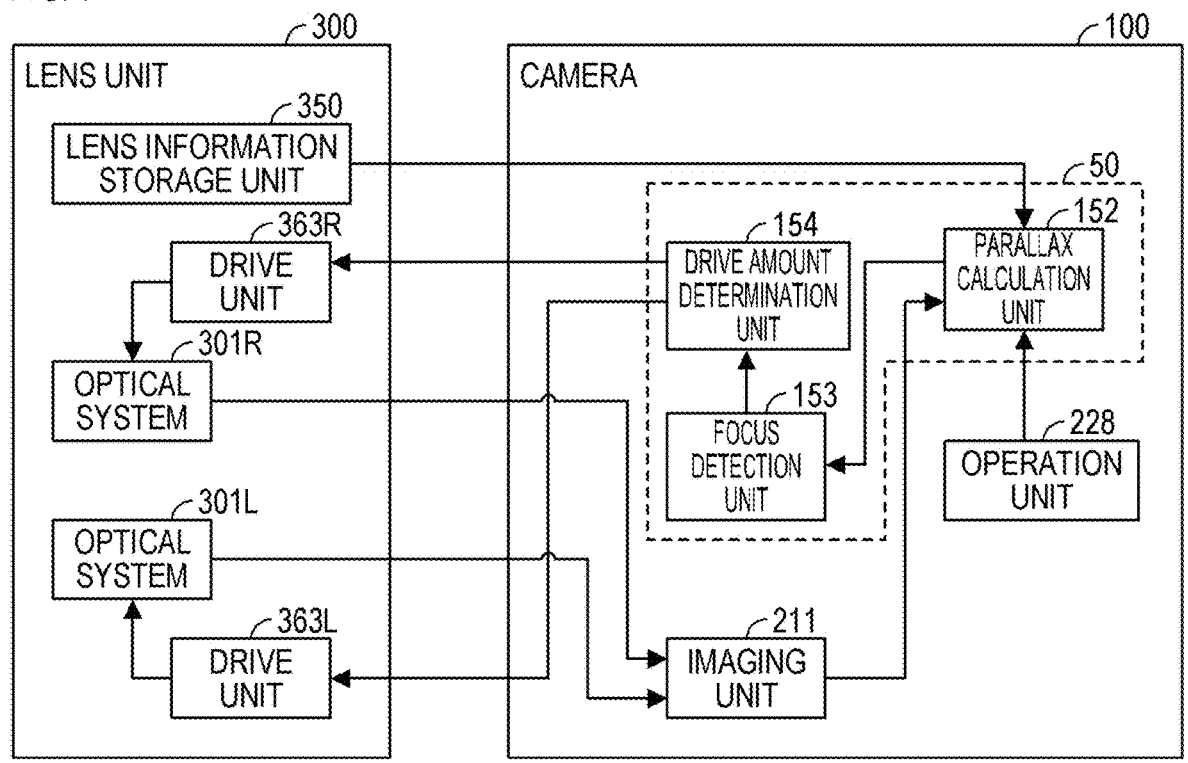
FIG. 7 is a block diagram of the camera system.

FIG. 7 is a block diagram illustrating an example of a configuration of a camera system according to the present embodiment. The camera system in FIG. 7 includes the camera 100 and the lens unit 300.

The lens unit 300 includes the optical systems 301R and 301L, drive units 363R and 363L, and a lens information storage unit 350. The optical systems 301R and 301L are as described above. The drive unit 363R drives the optical system 301R, and the drive unit 363L drives the optical system 301L. The lens information storage unit 350 stores lens information related to the lens unit 300. The lens information includes, for example, configuration information of the optical systems 301R and 301L. The lens information may include information (identifier) indicating whether the lens unit 300 is a dual-lens unit (a lens unit for obtaining a VR image capable of binocular stereoscopic vision).

As described above, the camera 100 includes the imaging unit 211, the operation unit 228, and the system control unit 50. The system control unit 50 includes a parallax calculation unit 152, a focus detection unit 153, and a drive amount determination unit 154. Note that the parallax calculation unit 152, the focus detection unit 153, and the drive amount determination unit 154 may be included in a device separate from the camera 100. For example, these components may be included in the lens system control circuit 303 (not illustrated in FIG. 7) of the lens unit 300 or may be included in a personal computer (PC) 500 described below.

As described above, the imaging unit 211 is configured with one imaging element, and the right image formed via the optical system 301R and the left image formed via the optical system 301L are formed on the imaging surface of the imaging unit 211. The operation unit 228 includes, for example, a touch panel or a joystick and is used by the user to designate an AF position (focus detection position) in the AF processing.

The parallax calculation unit 152 calculates a parallax amount between the right image formed via the optical system 301R and the left image formed via the optical system 301L based on the lens information stored in the lens information storage unit 350. Based on the calculated parallax amount and the AF position (AF position in the right image) corresponding to the optical system 301R, the parallax calculation unit 152 determines the AF position (AF position in the left image) corresponding to the optical system 301L. These two AF positions are image forming positions of the same object. The parallax calculation unit 152 may determine the AF position corresponding to the optical system 301R based on the calculated parallax amount and the AF position corresponding to the optical system 301L.

The focus detection unit 153 acquires an AF evaluation value (focus detection evaluation value) for the AF position designated by the user or the AF position determined by the parallax calculation unit 152. For example, when the AF position corresponding to the optical system 301R is designated by the user, the AF position corresponding to the optical system 301L is determined by the parallax calculation unit 152. Then, two AF evaluation values respectively corresponding to the two AF positions are acquired by the focus detection unit 153.

The drive amount determination unit 154 determines the drive amount of the optical system 301R and the drive amount of the optical system 301L based on the AF evaluation value acquired by the focus detection unit 153, outputs the drive amount of the optical system 301R to the drive unit 363R, and outputs the drive amount of the optical system 301L to the drive unit 363L. The drive units 363R and 363L drive the optical systems 301R and 301L with the drive amount determined by the drive amount determination unit 154.

Figure 8:
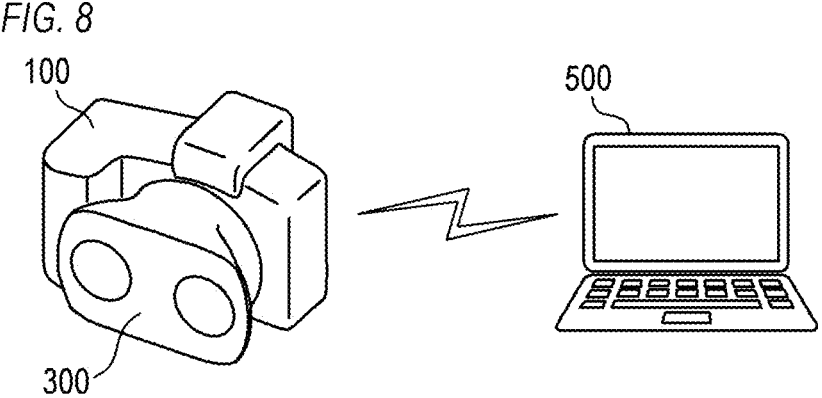
FIG. 8 is a schematic view illustrating a configuration of a PC live view system.

FIG. 8 is a schematic view illustrating an example of an overall configuration of the PC live view system according to the present embodiment. The PC live view system in FIG. 8 includes the camera 100 and the PC 500. The lens unit 300 is mounted (connected) to the camera 100. As described above, by mounting the lens unit 300, the camera 100 can capture a single image (a still image or a movie) that includes two image areas having a prescribed parallax. The PC 500 is an information processing apparatus that handles an image captured by the imaging apparatus such as the camera 100. FIG. 8 illustrates a configuration in which the camera 100 and the PC 500 are communicably connected to each other wirelessly or by wire.

Figure 9:
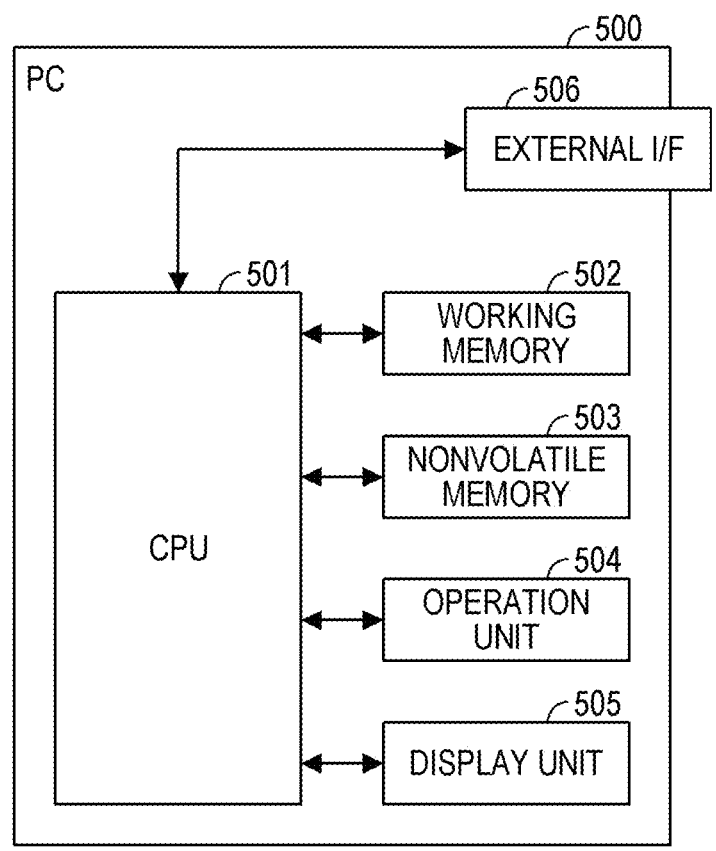
FIG. 9 is a block diagram of a PC.

FIG. 9 is a block diagram illustrating an example of a configuration of the PC 500. The PC 500 includes a CPU 501, a working memory 502, a nonvolatile memory 503, an operation unit 504, a display unit 505, and an external I/F 506.

For example, the CPU 501 controls each unit of the PC 500 by using the working memory 502 as a work memory according to a program stored in the nonvolatile memory 503. The working memory 502 is configured with, for example, a RAM (volatile memory using a semiconductor element or the like). The nonvolatile memory 503 stores image data, audio data, other data, and various programs for operating the CPU 501, and the like. The nonvolatile memory 503 is configured with, for example, a hard disk (HD), a ROM, and the like.

The operation unit 504 is an input device (receiving unit) capable of receiving a user operation. For example, the operation unit 504 includes a character information input device such as a keyboard, a pointing device such as a mouse or a touch panel, a button, a dial, a joystick, a touch sensor, and a touch pad. The operation unit 504 is used, for example, by a user to designate an AF position in the AF processing.

The display unit 505 displays various images, screens, and the like under the control of the CPU 501. For example, the display unit 505 displays a live view image obtained by the camera 100 or displays a GUI screen configuring a graphical user interface (GUI). The CPU 501 controls each unit of the PC 500 to generate a display control signal according to a program, generate a video signal to be displayed on the display unit 505, and output the video signal to the display unit 505. Note that the display unit 505 may be configured with an external monitor (a television or the like).

The external I/F 506 is an interface for connecting to an external device (for example, the camera 100) by a wired cable or wirelessly and performing input/output (data communication) of a video signal or an audio signal.

Figure 10:
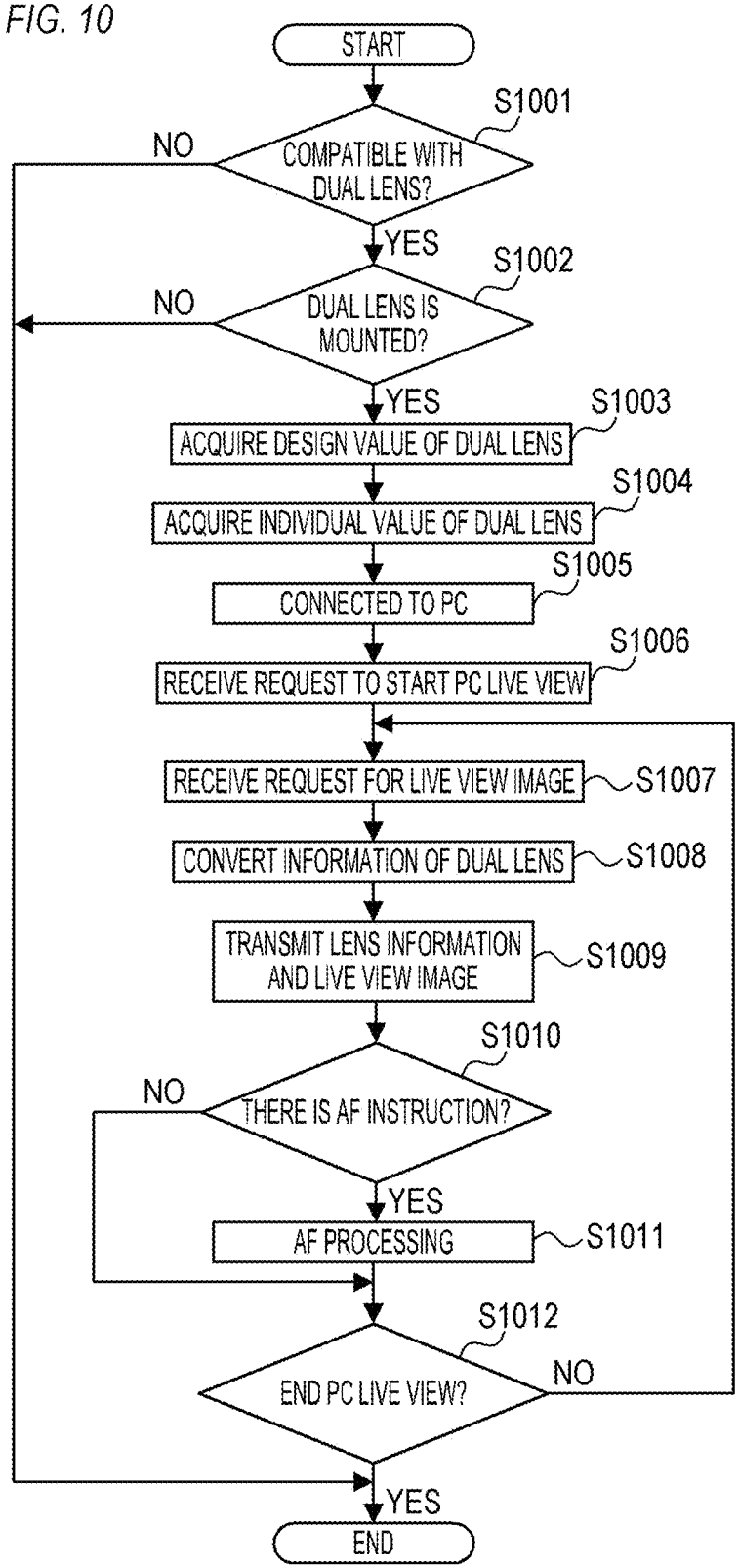
FIG. 10 is a flowchart illustrating an operation of the camera.

FIG. 10 is a flowchart illustrating an example of the operation of the camera 100. These operations are implemented by loading a program recorded in the nonvolatile memory 219 into the system memory 218 and executing the program by the system control unit 50. For example, when the camera 100 is started, the operations of FIG. 10 are started. The operations of FIG. 10 are operations for a function of displaying a live view image captured by the camera on the display unit of the PC (PC live view). The operations of FIG. 10 are performed in a case where the camera 100 is in a shooting standby state. When an instruction to start recording is inputted from the PC 500 during the operation of PC live view, still image shooting or movie shooting is performed. At this point, the PC live view may be continued.

In step S1001, the system control unit 50 determines whether the camera 100 is compatible with a dual-lens unit (a lens unit for obtaining a VR image capable of binocular stereoscopic vision, for example, lens unit 300). For example, the system control unit 50 determines whether the version of the firmware of the system control unit 50 is compatible with the dual-lens unit. If it is determined that the version is compatible with the dual-lens unit, the processing proceeds to step S1002, but otherwise the operation of FIG. 10 is ended. In the operation of FIG. 10, as the dual-lens unit, a dual-lens unit having an AF function (a dual-lens unit capable of performing AF processing of each optical system) is assumed.

In step S1002, the system control unit 50 determines whether the dual-lens unit is mounted to the camera 100. For example, the system control unit 50 acquires identification information of the lens unit from the lens unit mounted on the camera 100 and determines whether the lens unit is a dual-lens unit according to the acquired identification information. This identification information is a part of the lens information described above. If it is determined that the dual-lens unit is mounted, the processing proceeds to step S1003, but otherwise the operation of FIG. 10 is ended.

In step S1003, the system control unit 50 acquires, from the mounted (connected) dual-lens unit, a design value of the dual-lens unit. This design value is a part of the lens information described above. One or more design values, as discussed above, may be acquired.

In step S1004, the system control unit 50 acquires, from the mounted (connected) dual-lens unit, an individual value of the dual-lens unit. The individual value is a parameter specific for the lens unit, for example, an error during manufacturing. The individual value is a part of the lens information described above. One or more individual values may be acquired, each individual value may be a parameter specific for the lens unit.

In step S1005, the camera 100 is connected to the PC 500, and the system control unit 50 detects the connection of the camera 100 to the PC 500.

In step S1006, the system control unit 50 receives, from the PC 500, a request to start PC live view.

In step S1007, the system control unit 50 receives, from the PC 500, a request for a live view image.

In step S1008, the system control unit 50 converts the information obtained in steps S1003 and S1004 (lens information) to be compliant with the coordinate system of the live view image to be transmitted. The information obtained in steps S1003 and S1004 cannot be used as it is for the image processing of the live view image. Thus, lens information is converted into information compliant with the coordinate system of the live view image.

In step S1009, the system control unit 50 transmits the lens information converted in step S1008 and the live view image to the PC 500. In the present embodiment, the system control unit 50 of the camera 100 converts the lens information. However, the CPU 501 of the PC 500 may convert the lens information. In such embodiments, the lens information before the conversion and a parameter required for converting the lens information are transmitted to the PC 500.

In step S1010, the system control unit 50 determines whether there is an AF instruction from the PC 500. If it is determined that there is an AF instruction, the process proceeds to step S1011, but otherwise the process proceeds to step S1012.

In step S1011, the system control unit 50 performs the AF processing in accordance with the AF instruction. This AF instruction is, for example, the AF instruction transmitted from the PC 500 in step S1126 in FIG. 11. The AF instruction includes coordinates (coordinate information) of the AF position designated by the user. The system control unit 50 performs AF processing of the optical systems 301R and 301L based on the designated AF positions. The parallax calculation unit 152 acquires two AF positions respectively corresponding to the two optical systems 301R and 301L, and the focus detection unit 153 determines two AF evaluation values respectively corresponding to the two AF positions. Then, the drive amount determination unit 154 determines the drive amount of the optical system 301R, outputs the drive amount to the drive unit 363R, determines the drive amount of the optical system 301L, and outputs the drive amount to the drive unit 363L. In the present embodiment, in the camera 100, it is not assumed that coordinates inside the image area (inside the left image area) captured via the optical system 301L are included in AF instruction (by the user for specifying the AF position inside the left image area). In the camera 100, it is assumed that the coordinates inside the image area (inside the right image area) captured via the optical system 301R are included in the AF instruction (by the user for specifying the AF position inside the left image area). This image area assumed by the camera 100 is described as an AF position specifiable area.

In step S1012, the system control unit 50 determines whether to end the PC live view. For example, if the camera 100 and the PC 500 are disconnected from each other, or the user instructs the camera 100 or the PC 500 to end the PC live view, it is determined that the PC live view is to be ended. If it is determined that the PC live view is to be ended, the operations of FIG. 10 are ended, but otherwise the process proceeds to step S1007.

Figure 11:
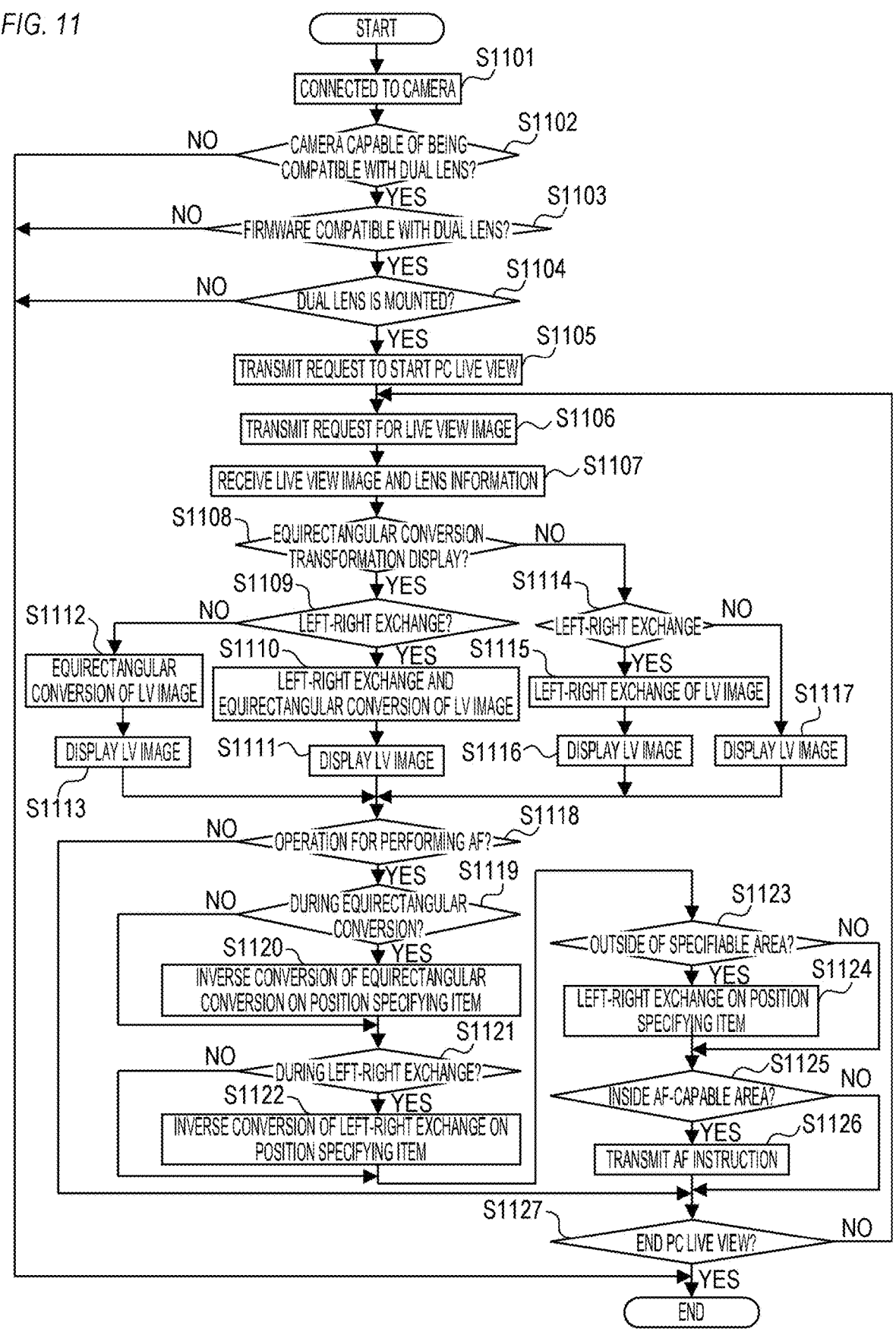
FIG. 11 is a flowchart illustrating an operation of the PC.

FIG. 11 is a flowchart illustrating an example of the operations of the PC 500. These operations are implemented by loading programs (application programs) recorded in the nonvolatile memory 503 into the working memory 502 by the CPU 501. For example, when the user instructs the PC 500 to start a specific application, the operations of FIG. 11 are started. The operations of FIG. 11 are operations for a function of displaying a live view image captured by the camera on the display unit of the PC (PC live view).

In step S1101, the camera (for example, the camera 100) is connected to the PC 500, and the CPU 501 detects the connection of the camera to the PC 500.

In step S1102, the CPU 501 determines whether the camera connected in step S1101 is a camera capable of being compatible with a dual-lens unit (a lens unit for obtaining a VR image capable of binocular stereoscopic vision, for example, the lens unit 300). For example, the CPU 501 acquires model information on the camera from the connected camera and determines whether the camera is compatible with the dual-lens unit based on the acquired model information. If it is determined that the camera is compatible with the dual-lens unit, the process proceeds to step S1103, but otherwise the operation of FIG. 11 is ended. The camera compatible with the dual-lens unit is, for example, a camera to which a dual-lens unit can be mounted. In the operation of FIG. 11, as the dual-lens unit, a dual-lens unit having an AF function (a dual-lens unit capable of performing AF processing of each optical system) is assumed.

In step S1103, the CPU 501 determines whether the firmware of the camera connected in step S1101 is compatible with the dual-lens unit. For example, the CPU 501 acquires version information on the firmware of the camera from the connected camera and determines whether the version of the firmware of the connected camera is compatible with the dual-lens unit based on the acquired information. If it is determined that the version is compatible with the dual-lens unit, the process proceeds to step S1104, but otherwise the operation of FIG. 11 is ended.

In step S1104, the CPU 501 determines whether the dual-lens unit is mounted to the camera connected in step S1101. For example, the CPU 501 acquires, from the connected camera, information indicating whether the dual-lens unit is mounted to the camera and determines whether the dual-lens unit is mounted to the connected camera based on the acquired information. If it is determined that the dual-lens unit is mounted, the process proceeds to step S1105, but otherwise the operation of FIG. 11 is ended.

In step S1105, the CPU 501 transmits a request to start PC live view to the camera connected in step S1101.

In step S1106, the CPU 501 transmits a request for the live view image to the camera connected in step S1101.

In step S1107, the CPU 501 receives, from the camera connected in step S1101, the live view image captured by the camera and lens information of the dual-lens unit mounted to the camera. The received lens information is information converted to be compliant with the received live view image (for example, the lens information converted in step S1008 of FIG. 10). The received live view image and the received lens information are, for example, the live view image and the lens information transmitted from the camera 100 in step S1009.

It is assumed that the lens information received in step S1107 includes the following information. Specifiable area information is information indicating the above-described AF position specifiable area (the right image area in the present embodiment). The AF-capable area information is area information indicating the AF-capable area. The AF-capable area is a predetermined area where AF processing is suitably executed and is an area included in the specifiable area. The AF-capable area may be identical to the specifiable area or may be narrower than the specifiable area. The AF processing outside the AF-capable area (the AF processing in which the position outside the AF-capable area is set as the AF position) may not be performed or may be performed. The AF-capable area be regarded as an AF recommended area. The AF-capable area may be regarded as an area where the AF position can be set or may be regarded as an area including a plurality of recommended AF positions (candidates). The lens information may comprise at least one of the following:

Specifiable area information;
AF-capable area information;
Center position of image circle;
Boundary position of image circle; and
Diameter of image circle.

Note that the lens information received in step S1107 may include the following information. The magic window area is an area (for example, the central portion) at a predetermined position defined in advance and is an area cut out (first) for VR display. That is, the magic window area is cut out from the shot image, is subjected to perspective projection conversion, and is displayed on the display device such as a head mounted display. The lens information may include at least one of the following:

Information indicating magic window area;
Information indicating manufacturing error of dual-lens unit; and
Correction data for improving accuracy of image processing of live view image (for example, a correction value obtained by calibration of the dual-lens unit).

In step S1108, the CPU 501 determines whether to perform equirectangular conversion transformation display. If it is determined that equirectangular conversion display is to be performed, the process proceeds to step S1109, but otherwise (when circular fish-eye display is to be performed), the process proceeds to step S1114.

In step S1109, the CPU 501 determines whether to perform arrangement conversion of a plurality of image regions (a plurality of image areas captured via a plurality of optical systems) in the live view image received (acquired) in step S1107. In the present embodiment, it is assumed that a live view image in which two image areas (a right image area and a left image area) are arranged side by side is received, and conversion (left-right exchange) of exchanging positions of the two image areas is performed as the arrangement conversion. If it is determined to perform left-right exchange, the process proceeds to step S1110, but otherwise the process proceeds to step S1112.

In step S1110, the CPU 501 performs left-right exchange and equirectangular conversion on the live view image received in step S1107 based on the lens information received (acquired) in step S1107, for example, the center position of each image circle. As a result, an image obtained by performing left-right exchange and equirectangular conversion on the received live view image is obtained as a display image (image to be displayed). For example, the left-right exchange is performed so that the right image area is arranged around the center of the left image area before the left-right exchange, and the left image area is arranged around the center of the right image region before the left-right exchange. Then, equirectangular conversion is performed on each of the right image area and the left image area. In the present embodiment, it is assumed that each of the right image area and the left image area in the received live view image is a region of the circular fish-eye image. Equirectangular conversion is conversion processing in which a circular fish-eye image is assumed to be a sphere and is converted to have latitude lines (horizontal lines) and longitude lines (vertical lines) crossing each other at right angles as in equirectangular projection for a map. Through the equirectangular conversion, the circular fish-eye image is converted into a rectangle equirectangular conversion image.

In step S1111, the CPU 501 displays the display image generated in step S1110 (the live view image after the left-right exchange and the equirectangular conversion) on the display unit 505.

In step S1112, as in step S1110, the CPU 501 performs equirectangular conversion on the live view image received in step S1107. The left-right exchange is not performed. As a result, the image obtained by performing equirectangular conversion on the received live view image is obtained as the display image.

In step S1113, the CPU 501 displays the display image generated in step S1112 (the live view image after the equirectangular conversion) on the display unit 505.

In step S1114, as in step S1109, the CPU 501 determines whether to perform the arrangement conversion (left-right exchange). If it is determined that the left-right exchange is performed, the process proceeds to step S1115, but otherwise the process proceeds to step S1117.

In step S1115, as in step S1110, the CPU 501 performs left-right exchange on the live view image received in step S1107. The equirectangular conversion is not performed. As a result, the image obtained by performing left-right exchange on the received live view image is obtained as the display image.

In step S1116, the CPU 501 displays the display image generated in step S1115 (the live view image after the left-right exchange) on the display unit 505.

In step S1117, the CPU 501 displays the live view image received in step S1107 on the display unit 505 (as a display image).

The CPU 501 displays an item (position specifying item, for example, a cursor) indicating a position inside the display image on the display unit 505 together with the display image described above. The operation unit 504 can receive a user operation of changing the position (a position indicated by the item, a display position of the item) of the item.

In step S1118, the CPU 501 determines whether a user operation (AF performing operation) for performing the AF processing is performed. The AF performing operation is performed using the operation unit 504. If it is determined that the AF performing operation is performed, the process proceeds to step S1119, but otherwise the process proceeds to step S1127.

In step S1119, the CPU 501 determines whether the equirectangular conversion of the live view image is performed. When it is determined that the equirectangular conversion is performed, the process proceeds to step S1120, and otherwise the process proceeds to step S1121.

In step S1120, the CPU 501 performs inverse conversion of the equirectangular conversion on the coordinates of the position specifying item (coordinates when AF execution operation of step S1118 is performed). As a result, it is possible to obtain coordinates of the live view image in a circular fish-eye format before equirectangular conversion, which corresponds to the coordinates specified by the user.

In step S1121, the CPU 501 determines whether the left-right exchange of the live view image is performed. When it is determined that the left-right exchange is performed, the process proceeds to step S1122, and otherwise the process proceeds to step S1123.

In step S1122, the CPU 501 performs the inverse conversion of the left-right exchange on the coordinates of the position specifying item. When the inverse conversion of the equirectangular conversion is performed, the inverse conversion of the left-right exchange is performed on the coordinates after the inverse conversion of the equirectangular conversion. When the inverse conversion of the equirectangular conversion is not performed, the inverse conversion of the left-right exchange is performed on the coordinates obtained in step S1118. As a result, it is possible to obtain the coordinates of the live view image before left-right exchange, which corresponds to the coordinates specified by the user.

In step S1123, the CPU 501 determines whether the coordinates of the position specifying item is outside an AF position specifiable area (the right image area in the present embodiment) based on the specifiable area information included in the lens information received (acquired) in step S1107. This determination may be interpreted as determination of whether the coordinates of the position specifying item are inside the other one of the image areas (the left image area in the present embodiment). When the inverse conversion of the equirectangular conversion is performed, it is determined whether the coordinates after the inverse conversion of the equirectangular conversion are outside the specifiable area. When the inverse conversion of the left-right exchange is performed, it is determined whether the coordinates after the inverse conversion of the left-right exchange are outside the specifiable area. When the inverse conversion of the left-right exchange and the inverse conversion of the equirectangular conversion are performed, it is determined whether the coordinates after the inverse conversion are outside the specifiable area. When neither the inverse conversion of the left-right exchange nor the inverse conversion of the equirectangular conversion is performed, it is determined whether the coordinates obtained in step S1118 are outside the specifiable area. In a case where it is determined that the position of the position specifying item is outside the specifiable area, the process proceeds to step S1124, but otherwise, the process proceeds to step S1125.

In step S1124, the CPU 501 performs the left-right exchange on the coordinates of the position specifying item determined in step S1123. As a result, the coordinates of the position specifying item are converted to the coordinates inside the other one of the image areas (the left image area in the present embodiment) which correspond to the coordinates (coordinates inside the specifiable area (the right image area in the present embodiment)).

In step S1125, the CPU 501 determines whether the position of the position specifying item is inside the AF-capable area based on the AF-capable area information included in the lens information received (acquired) in step S1107. When left-right exchange is performed on the coordinates of the position specifying item, it is determined whether the coordinates after the left-right exchange are inside the AF-capable area. When left-right exchange is not performed on the coordinates of the position specifying item, it is determined whether the coordinates determined in step S1123 are inside the AF-capable area. In a case where it is determined that the position of the position specifying item is inside the AF-capable area, the process proceeds to step S1126, but otherwise, the process proceeds to step S1127.

In step S1126, the CPU 501 transmits an AF instruction including the coordinates of the position specifying item determined in step S1125 as the coordinates of the AF position (the AF position specified by the user) to the camera connected in step S1101. As a result, the camera is controlled to perform the AF processing based on the coordinates inside the specifiable area.

In the present embodiment, step S1126 is performed only in a case where the position of the position specifying item is within the AF-capable area. Therefore, the AF processing is not performed in the camera in a case where the position of the position specifying item is outside the AF-capable area, and the AF processing is performed in a case where the position of the position specifying item is inside the AF-capable area. However, step S1126 may be performed regardless of whether the position of the position specifying item is in the AF-capable area. That is, the AF processing may be performed in the camera regardless of whether the position of the position specifying item is in the AF-capable area. Otherwise, processing of step S1125 is skipped, and step S1126 may be performed regardless of whether the position of the position specifying item is inside of the AF-capable area. Then, whether the position is inside the AF-capable area on the camera side is determined, and the AF processing may be selectively performed depending on the determination result.

In step S1127, the CPU 501 determines whether to end the PC live view. If it is determined to end the PC live view, the operations of FIG. 11 are ended, but otherwise the process proceeds to step S1106.

Figure 12A:
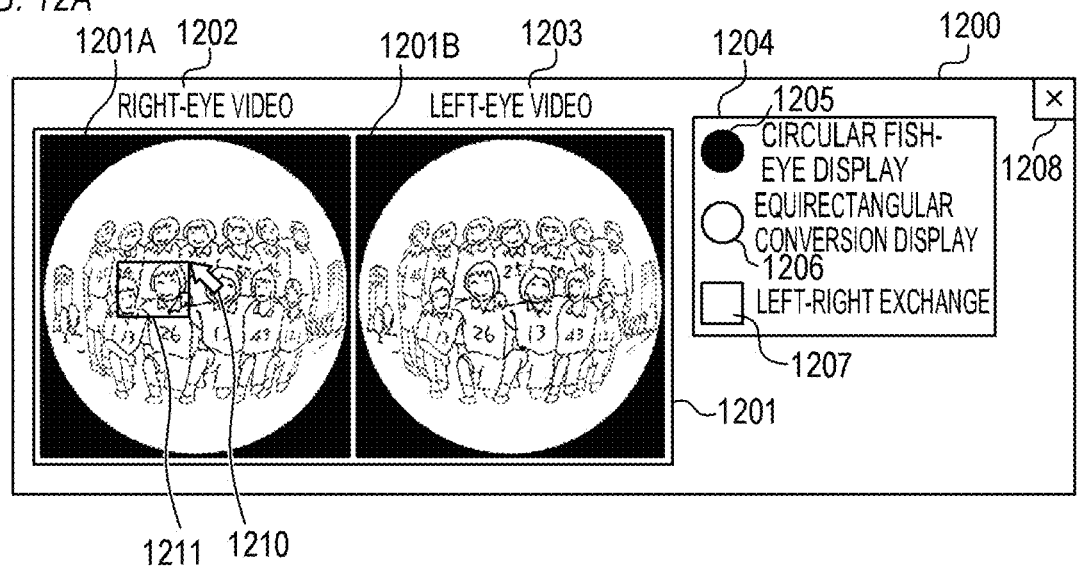
FIGS. 12A and 12B are schematic diagrams of an application screen.
Figure 12B:
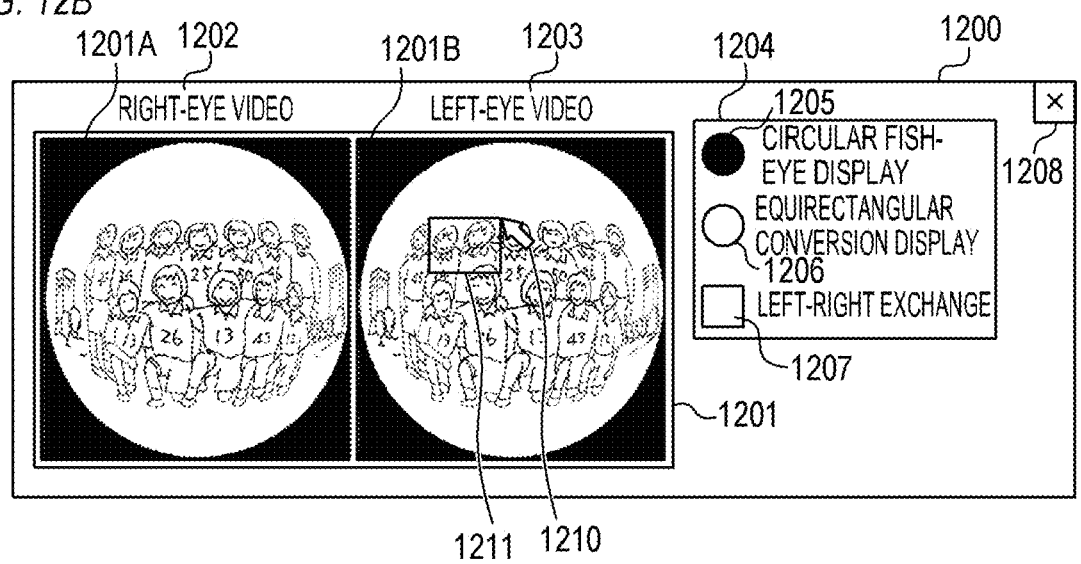

FIGS. 12A and 12B are schematic diagrams illustrating display examples of an application screen displayed on the display unit 505 by the CPU 501 during the PC live view when the camera 100 is connected to the PC 500. A screen 1200 is the application screen (remote live view screen). The screen 1200 includes a live view display area 1201, a guide display area 1202, a guide display area 1203, an operation area 1204, and an end button 1208.

The live view display area 1201 is an area for displaying a live view image. The live view display area 1201 includes a left-side display area 1201A and a right-side display area 1201B.

The guide display area 1202 is an area for displaying a character string indicating whether the image displayed in the left-side display area 1201A is an image captured via which one of the two optical system 301L and 301R in the dual-lens unit. The guide display area 1203 is an area for displaying a character string indicating whether the image displayed in the right-side display area 1201B is an image captured via which one of two optical systems 301L and 301R in the dual-lens unit.

The operation area 1204 is an area for receiving an operation for PC live view. The radio buttons 1205 and 1206 and the check box 1207 are displayed in the operation area 1204.

The radio button 1205 is selected in case of performing the circular fish-eye display, and the radio button 1206 is selected in case of performing the equirectangular conversion display. When the radio button 1205 is selected, the radio button 1206 is not selected. When the radio button 1205 is not selected, the radio button 1206 is selected.

In FIGS. 12A and 12B, the radio button 1205 is selected, and the radio button 1206 is not selected. Therefore, circular fish-eye display is performed (a circular fish-eye image is displayed in the display areas 1201A and 1202B). Note that, when the radio button 1205 is in the unselected state, and the radio button 1206 is in a selected state, equirectangular conversion display (the display of the equirectangular conversion image) is performed instead of the circular fish-eye display (the display of the circular fish-eye image).

The check box 1207 is a check box to be checked when the left-right exchange is performed. When the check box 1207 is checked, display positions of a right image area (an area of a right-eye video; a right-eye video area) in the live view image and a left image area (an area of a left-eye video area; a left-eye video area) may be exchanged. Accordingly, the character strings displayed in the guide display areas 1202 and 1203 are also exchanged.

In FIGS. 12A and 12B, the check box 1207 is not checked. Therefore, the left-right exchange is not performed, the right image (right-eye video) captured via the optical system 301R is displayed in the display area 1201A, and the left image (left-eye video) captured via the optical system 301L is displayed in the display area 1201B.

The end button 1208 is a button for ending the PC live view.

A cursor 1210 is an item (position specifying item) for specifying a position of an AF frame 1211 inside the live view image.

The user can move the cursor 1210 by a user operation (for example, moving a mouse) using operation unit 504. According to the movement of the cursor 1210, the AF frame 1211 also moves. Furthermore, the user can instruct to perform the AF processing by a user operation (for example, clicking a mouse button) using the operation unit 504. When it is instructed to perform the AF processing, an AF instruction including the current coordinates of the cursor 1210 is transmitted to the camera 100. Then, the camera 100 performs the AF processing based on the coordinates of the cursor 1210.

As illustrated in FIG. 12A, when the cursor 1210 is in the display area 1201A of the right-eye video, in step S1123, the CPU 501 determines that the coordinates of the position specifying item are inside the AF position specifiable area (NO in step S1123). Meanwhile, as illustrated in FIG. 12B, when the cursor 1210 is in the display area 1201B of the left-eye video, in step S1123, the CPU 501 determines that the coordinates of the position specifying item are outside the AF position specifiable area (YES in step S1123). In this case, in step S1124, the CPU 501 performs left-right exchange of the position specifying item.

As described above, according to the present embodiment, in a case where the coordinates in the display image specified by the user operation correspond to the coordinates inside the specifiable area (inside the right image area), control is performed so that predetermined processing is performed based on the coordinates inside the specifiable area. Also, in a case where the coordinates inside the display image which are specified by the user operation correspond to the coordinates outside the specifiable area of (inside the left image area), control is performed so that the predetermined processing is executed based on the coordinates inside the right image area which correspond to the coordinates in the left image area. In this manner, the user can intuitively specify a position without being conscious of an image area capable of receiving specification of the position (coordinates), and further usability is improved.

Note that the above-described various types of control may be processing that is carried out by one piece of hardware (e.g., processor or circuit), or otherwise. Processing may be shared among a plurality of pieces of hardware (e.g., a plurality of processors, a plurality of circuits, or a combination of one or more processors and one or more circuits), thereby carrying out the control of the entire device.

Also, the above processor is a processor in the broad sense, and includes general-purpose processors and dedicated processors. Examples of general-purpose processors include a central processing unit (CPU), a micro processing unit (MPU), a digital signal processor (DSP), and so forth. Examples of dedicated processors include a graphics processing unit (GPU), an application-specific integrated circuit (ASIC), a programmable logic device (PLD), and so forth. Examples of PLDs include a field-programmable gate array (FPGA), a complex programmable logic device (CPLD), and so forth.

The embodiment described above (including variation examples) is merely an example. Any configurations obtained by suitably modifying or changing some configurations of the embodiment within the scope of the subject matter of the present disclosure are also included in the present disclosure. The present disclosure also includes other configurations obtained by suitably combining various features of the embodiment.

For example, the CPU 501 may perform setting for whether to perform AF processing (AF instruction) when the coordinates (the coordinates inside the display image which are specified by the user operation) of the position specifying item are outside the specifiable area (outside of the right image area, inside of the left image area) in response to the instruction from the user. In the setting in which AF processing (AF instruction) is not executed when the coordinates of the position specifying item is outside the specifiable area, the process proceeds from step S1123 to step S1127 when the coordinates of the position specifying item are outside the specifiable area, and step S1124 is omitted.

The CPU 501 may perform the predetermined notification when the coordinates of the position specifying item are outside the specifiable area. The predetermined notification is notification that the conversion (left-right exchange) of the AF position is performed, or notification that AF processing (AF instruction) cannot be performed. The notification method is not particularly limited, and notification may be made by display, or notification may be made by a voice. The CPU 501 is inside the right image area (the image area corresponding to the specifiable area) in the display image and may display an item (for example, the AF frame) indicating the position corresponding to the AF position.

The example in which the specifiable area is the right image area is described, but the specifiable area may be the left image area. It is described that one image in which two image areas having a parallax are arranged side by side is acquired, but the number of image areas, that is, the number of optical systems may be larger than two, and the arrangement of the plurality of image areas is not particularly limited. An example in which the AF processing (focus adjustment) is executed based on the coordinates of the position specifying item is described, but white balance adjustment, enlargement display, photometry (exposure adjustment), and the like may be performed.

At least a part of the processing described as being performed by the PC 500 may be performed by the camera 100 or another external device (for example, a cloud server). At least a part of the processing described as being performed by the camera 100 may be performed by the PC 500 or another external device (for example, a cloud server).

In addition, the present disclosure is not limited to a camera and a PC and is applicable to any electronic device that can handle an image having a plurality of image areas corresponding to a plurality of optical systems. For example, the present disclosure is applicable to a PDA, a mobile phone terminal, or a portable image viewer, a printer device, a digital photo frame, a music player, a video game machine, an electronic book reader, a cloud server, and the like. Also, the present disclosure is further applicable to, for example, a video player, a display device (including a projector), a tablet terminal, a smartphone, an AI speaker, a home electrical appliance device, and an on-vehicle device. The disclosure is also applicable to a multi-view smartphone or the like with a plurality of optical systems of different types, such as a standard lens, a wide-angle lens, and a zoom lens.

According to the present disclosure, the user can intuitively specify a position without being conscious of an image area capable of receiving specification of the position (coordinates), and further usability is improved.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-195051, filed on Nov. 16, 2023, which is hereby incorporated by reference herein in its entirety.

What is claimed is:

1. An electronic device comprising:
a processor; and
a memory storing a program which, when executed by the processor, causes the electronic device to
execute acquisition processing to acquire an image including a plurality of image areas captured via a plurality of optical systems, execute display control processing to perform control so that a display image based on the acquired image is displayed,
execute reception processing to receive a user operation for specifying coordinates inside the display image, and
execute control processing to
 perform control so that, in a case where the coordinates inside the display image specified by the user operation correspond to coordinates inside a first image area among the plurality of image areas, predetermined processing is executed on a basis of the coordinates inside the first image area, and
 perform control so that, in a case where the coordinates inside the display image specified by the user operation correspond to coordinates inside a second image area among the plurality of image areas, the predetermined processing is executed on a basis of coordinates inside the first image area corresponding to the coordinates inside the second image area.

2. The electronic device according to claim 1, wherein the predetermined processing is focus adjustment, white balance adjustment, or enlargement display.

3. The electronic device according to claim 1, wherein the display image is an image obtained by performing equirectangular conversion on the image, and
in the control processing, control is performed so that the predetermined processing is executed on a basis of coordinates obtained by performing inverse conversion of the equirectangular conversion on the coordinates inside the display image specified by the user operation.

4. The electronic device according to claim 1, wherein the display image is an image obtained by performing arrangement conversion of the plurality of image areas on the image, and
in the control processing, control is performed so that the predetermined processing is executed on a basis of coordinates obtained by performing inverse conversion of the arrangement conversion on the coordinates inside the display image specified by the user operation.

5. The electronic device according to claim 4, wherein the image is an image in which the first image area and the second image area are arranged side by side and
the arrangement conversion is conversion for exchanging a position of the first image area and a position of the second image area.

6. The electronic device according to claim 1, wherein the program, when executed by the processor, further causes the electronic device to execute notification control processing to perform control so that predetermined notification is performed in a case where the coordinates inside the display image specified by the user operation correspond to the coordinates inside the second image area.

7. The electronic device according to claim 1, wherein the program, when executed by the processor, further causes the electronic device to execute setting processing to set whether to execute predetermined processing in response to an instruction from a user in a case where the coordinates inside the display image specified by the user operation correspond to the coordinates inside the second image area.

8. A control method of an electronic device, comprising:
acquiring an image including a plurality of image areas captured via a plurality of optical systems,
performing control so that a display image based on the acquired image is displayed,
receiving a user operation for specifying coordinates inside the display image, and
performing control so that, in a case where the coordinates inside the display image specified by the user operation correspond to coordinates inside a first image area among the plurality of image areas, predetermined processing is executed on a basis of the coordinates inside the first image area, and
performing control so that, in a case where the coordinates inside the display image specified by the user operation correspond to coordinates inside a second image area among the plurality of image areas, the predetermined processing is executed on a basis of coordinates inside the first image area corresponding to the coordinates inside the second image area.

9. A non-transitory computer readable medium that stores a program, wherein the program causes a computer to execute a control method of an electronic device, the control method comprising:
acquiring an image including a plurality of image areas captured via a plurality of optical systems,
performing control so that a display image based on the acquired image is displayed,
receiving a user operation for specifying coordinates inside the display image, and
performing control so that, in a case where the coordinates inside the display image specified by the user operation correspond to coordinates inside a first image area among the plurality of image areas, predetermined processing is executed on a basis of the coordinates inside the first image area, and
performing control so that, in a case where the coordinates inside the display image specified by the user operation correspond to coordinates inside a second image area among the plurality of image areas, the predetermined processing is executed on a basis of coordinates inside the first image area corresponding to the coordinates inside the second image area.

* * * * *